{12} United States Patent
Kurihara

(10) Patent No.: US 9,715,407 B2
(45) Date of Patent: Jul. 25, 2017

(54) COMPUTER PRODUCT, MULTICORE PROCESSOR SYSTEM, AND SCHEDULING METHOD

(71) Applicant: FUJITSU LIMITED, Kawasaki-shi, Kanagawa (JP)

(72) Inventor: Koji Kurihara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/478,237

(22) Filed: Sep. 5, 2014

(65) Prior Publication Data

US 2014/0380326 A1  Dec. 25, 2014

Related U.S. Application Data

(63) Continuation of application No. PCT/JP2012/057065, filed on Mar. 19, 2012.

(51) Int. Cl.
G06F 3/00   (2006.01)
G06F 9/46   (2006.01)
G06F 9/48   (2006.01)
G06F 9/54   (2006.01)
G06F 9/50   (2006.01)

(52) U.S. Cl.
CPC .......... *G06F 9/4881* (2013.01); *G06F 9/4893* (2013.01); *G06F 9/50* (2013.01); *G06F 9/54* (2013.01); *G06F 2209/486* (2013.01); *Y02B 60/144* (2013.01)

(58) Field of Classification Search
CPC ............ G06F 9/54; G06F 9/4881; G06F 9/50
USPC .................. 719/310; 718/106, 104
See application file for complete search history.

(56) References Cited

U.S. PATENT DOCUMENTS 6,298,448 B1  10/2001 Shaffer et al.
7,254,812 B1*  8/2007 Menezes .............. G06F 9/485
                                              713/320
8,695,008 B2*  4/2014 Regini ................ G06F 9/5094
                                              713/322

(Continued)

FOREIGN PATENT DOCUMENTS

JP  2002-099433   4/2002
JP  2002-533801   10/2002

(Continued)

OTHER PUBLICATIONS

Colby Ranger, Evaluating MapReduce for Multi-core and Multi-processor Systems, 2007.*

(Continued)

*Primary Examiner* — Lechi Truong
(74) *Attorney, Agent, or Firm* — Staas & Halsey LLP

(57) ABSTRACT

A non-transitory, computer-readable recording medium stores a scheduling program that causes a first core among multiple cores to execute a process that includes selecting a core from the cores; referring to a storage unit to assign first software assigned to the selected core, to a second core different from the selected core and among the cores, the storage unit being configured to store for each core among the cores, identification information of software assigned to the core; and assigning second software to the selected core as a result of assigning the first software to the second core, the second software being assigned when an activation request for the second software is accepted.

11 Claims, 20 Drawing Sheets

(56) References Cited

U.S. PATENT DOCUMENTS

| | | | | |
|---|---|---|---|---|
| 2005/0050373 A1* | 3/2005 | Orenstien | ............... | G06F 1/206 |
| | | | | 713/320 |
| 2006/0095911 A1 | 5/2006 | Uemura et al. | | |
| 2007/0283128 A1 | 12/2007 | Hoshaku | | |
| 2008/0028236 A1* | 1/2008 | Capps | ..................... | G06F 1/206 |
| | | | | 713/300 |
| 2010/0070739 A1* | 3/2010 | Nakamura | ................ | G06F 9/54 |
| | | | | 712/29 |
| 2013/0067132 A1* | 3/2013 | Guddeti | .................. | G06F 13/24 |
| | | | | 710/260 |

FOREIGN PATENT DOCUMENTS

| | | |
|---|---|---|
| JP | 2006-133995 | 5/2006 |
| JP | 2007-328461 | 12/2007 |
| JP | 2008-225641 | 9/2008 |
| JP | 2010-128895 | 6/2010 |
| JP | 2010-277171 | 12/2010 |

OTHER PUBLICATIONS

International Search Report mailed Apr. 24, 2012 in corresponding international application PCT/JP2012/057065.

* cited by examiner

FIG.4

SYSTEM INFORMATION TABLE ~311

| CPU ID | CLOCK FREQUENCY | ACTIVATION CPU FLAG | ASSIGNED APP | TEMPER-ATURE | |
|---|---|---|---|---|---|
| #0 | $f_{overclock}$ | 0 | APP 0 | $T_{low}$ | ~ 401-1 |
| #1 | $f_{low}$ | 1 | NONE | $T_{high}$ | ~ 401-2 |
| #2 | $f_{other}$ | 0 | APP 2, APP 4 | $T_{low}$ | ~ 401-3 |
| #3 | $f_{other}$ | 0 | APP 3, APP 5 | $T_{low}$ | ~ 401-4 |

FIG.5

APP INFORMATION TABLE ~312

| APP ID | ACTIVATION TIME | MAIN APP FLAG | |
|---|---|---|---|
| APP 0 | mm/dd/hh:mm:ss | 1 | ~ 501-1 |
| APP 1 | ... | 0 | ~ 501-2 |
| APP 2 | ... | 0 | ~ 501-3 |
| APP 3 | ... | 0 | ~ 501-4 |
| ... | ... | ... | |

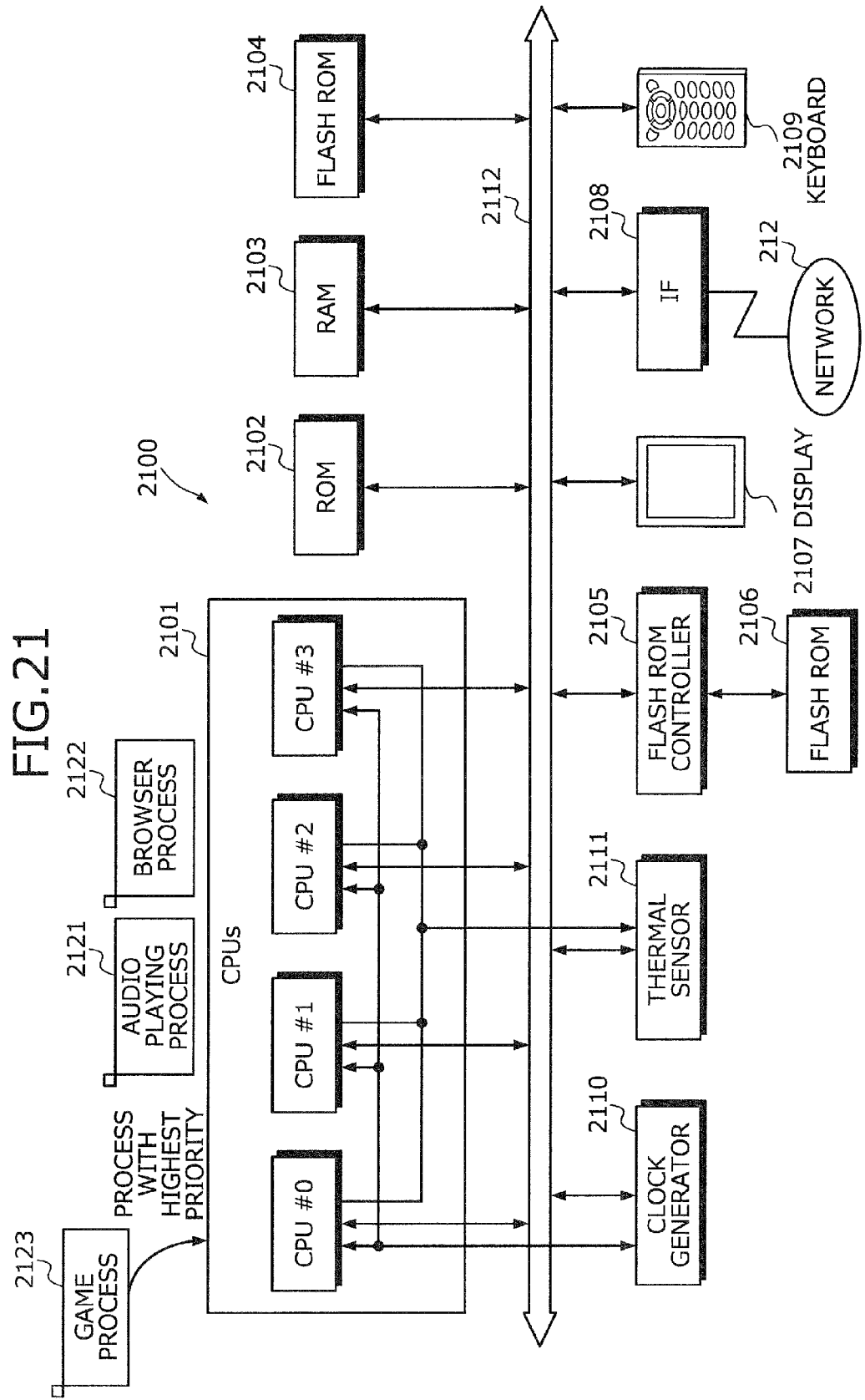

ND SCHEDULING
COMPUTER PRODUCT, MULTICORE PROCESSOR SYSTEM, AND SCHEDULING METHOD

CROSS REFERENCE TO RELATED APPLICATIONS

This application is a continuation application of International Application PCT/JP2012/057065, filed on Mar. 19, 2012 and designating the U.S., the entire contents of which are incorporated herein by reference.

FIELD

The embodiments discussed herein are related to a computer product, a multicore processor system, and a scheduling method.

BACKGROUND

According to a scheduling technique, application software to be assigned to central processing units (CPUs) is determined. The application software will hereinafter be referred to as an "app".

According to a related technique, for example, when an app assigned to a CPU is determined by a scheduling technique, the clock frequency is changed according to the process request for the app assigned to the CPU. According to another disclosed technique, when an app with a real-time constraint is executed in a system periodically executing the app with the real-time constraint and an app without a real-time constraint, the clock frequency is changed such that the real-time constraint can be satisfied. According to a further disclosed technique, when the temperature that a CPU will reach with the execution of an app is predicted, if the predicted temperature exceeds a specified temperature, the app is assigned to another CPU (see, for example, Japanese Laid-Open Patent Publication Nos. 2002-533801, 2002-99433, and 2006-133995).

Nonetheless, according to the conventional techniques, if an activation request for software is accepted, an activation process of the software may be delayed by a process of other software already assigned. For example, if a process of other software is being executed at the time of acceptance of an activation request for software, a CPU starts the activation process of the software after the process of the other software is completed or after the process of the other software is stopped and consequently, the activation process of the software is delayed. If the activation process of the software and the process of the other software are switched and processed in time division, a CPU must stop the activation process of the software after expiration of an assignment time to execute the process of the other software, whereby the activation process of the software may be delayed.

SUMMARY

According to an aspect of an embodiment, a non-transitory, computer-readable recording medium stores a scheduling program that causes a first core among multiple cores to execute a process that includes selecting a core from the cores; referring to a storage unit to assign first software assigned to the selected core, to a second core different from the selected core and among the cores, the storage unit being configured to store for each core among the cores, identification information of software assigned to the core; and assigning second software to the selected core as a result of assigning the first software to the second core, the second software being assigned when an activation request for the second software is accepted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view of an example of the contents of a system information table;

FIG. 5 is an explanatory view of an example of the contents of an app information table;

FIG. 21 is an explanatory view of an application example of a scheduling program according to the present embodiment.

DESCRIPTION OF EMBODIMENTS

Embodiments of a scheduling program, a multicore processor system, and a scheduling method will be described in detail with reference to the accompanying drawings. In the description, a multicore processor system having multiple processors is taken as an example of an apparatus executing a scheduling program according to the present embodiment. A multicore processor is a processor equipped with multiple cores. Herein, as long as multiple cores are provided, the multicore processor may be a single processor equipped with multiple cores or a group of single-core processors arranged in parallel. In this embodiment, a group single-core processors arranged in parallel will be used as an example for simplicity of description. A processor will be referred to as a CPU in the following description.

Figure 1A:
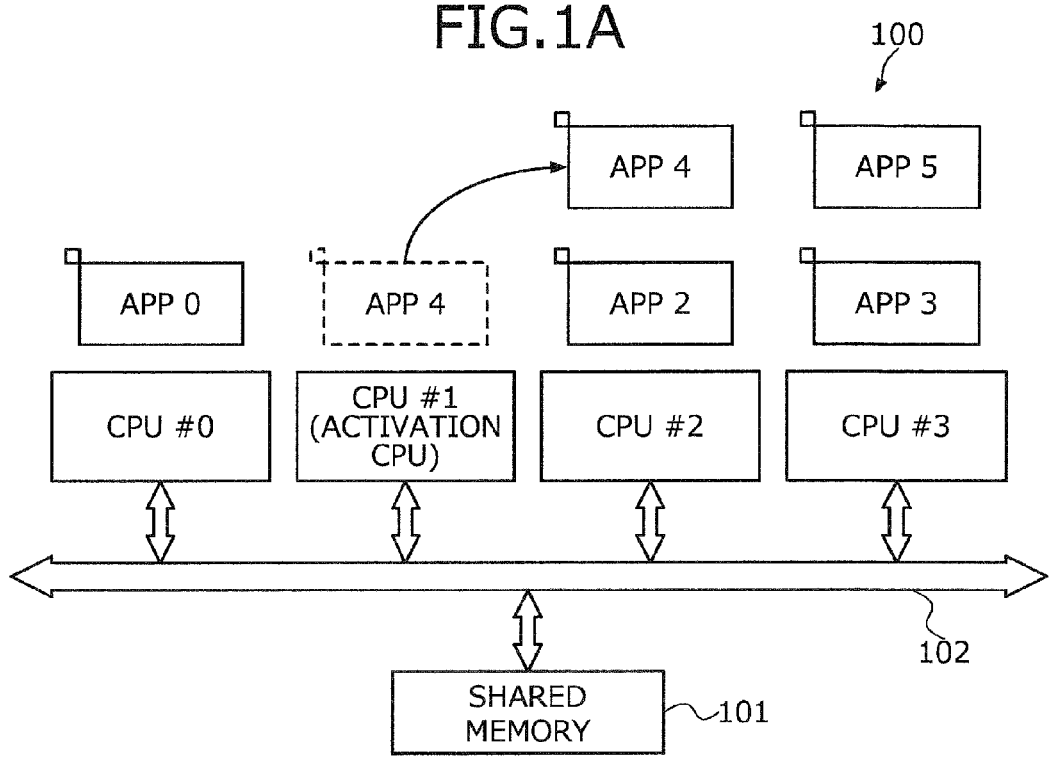
FIGS. 1A and 1B are explanatory views of an operation example of a multicore processor system in the present embodiment.
Figure 1B:
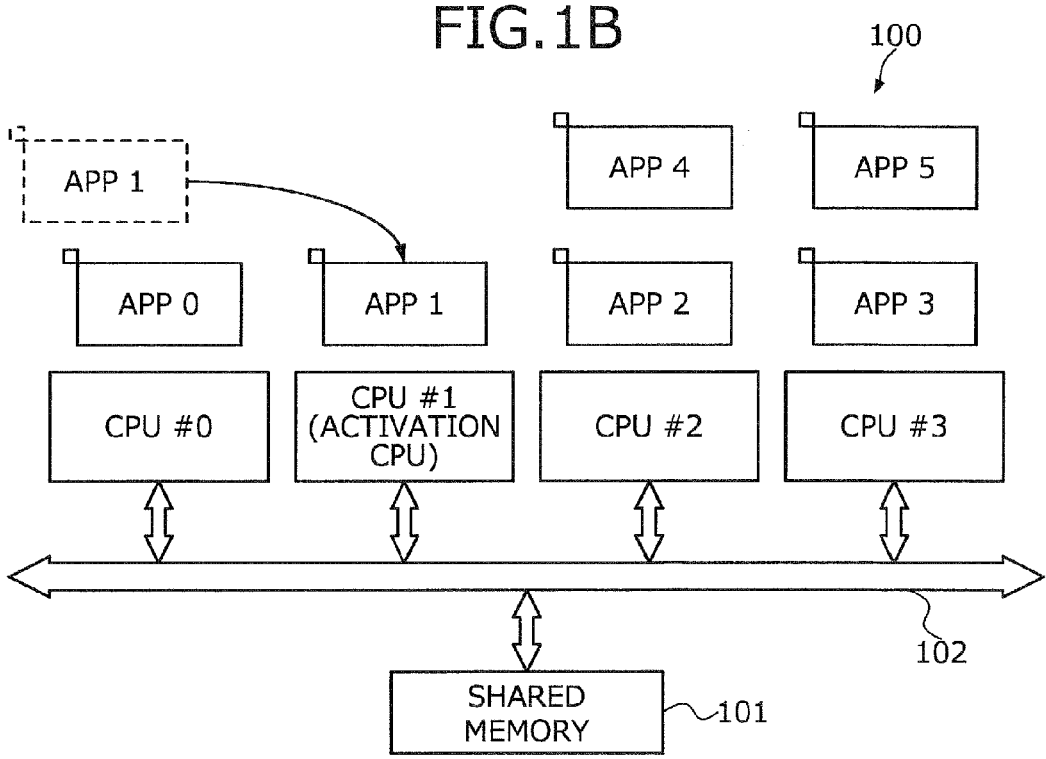

FIGS. 1A and 1B are explanatory views of an operation example of a multicore processor system in the present embodiment. The multicore processor system 100 has CPUs #0 to #3 and shared memory 101. The CPUs #0 to #3 are connected by a bus 102.

In FIG. 1A, the CPU #0 has been assigned an app 0; the CPU #1 has been assigned an app 4; the CPU #2 has been assigned an app 2; and the CPU #3 has been assigned apps 3 and 5.

In this state, the CPU #0 executing the scheduling program selects, for example, the CPU #1 as an activation CPU among the CPUs #0 to #3. The selected CPU may be any CPU. The CPU #0 refers to the shared memory 101, which stores for each CPU, identification information of the apps assigned to the CPU, and the CPU #0 assigns the app 4 assigned to the CPU #1 to a CPU other than the CPU #1 among the CPUs #0 to #3. In the example depicted in FIG. 1A, the CPU #0 assigns the app 4 to the CPU #2.

FIG. 1B depicts a case of accepting an app activation request after the state depicted in FIG. 1A. The CPU #0 assigns an app 1 specified in the activation request to the CPU #1, which has been selected as an activation CPU. Since the CPU #1 has no assigned app other than the app 1 and therefore, can be dedicated for the activation process of the app 1, the CPU #1 can execute the activation process of the app 1 at high speed.

As described above, the CPU #0 selects an activation CPU for app activation, from a CPU group and transfers apps assigned to the selected activation CPU to another core. As a result, since the activation CPU can be dedicated for an app activation process at the time of an app activation request, the multicore processor system 100 can shorten the time until completion of the app activation process. The multicore processor system 100 according to the present embodiment will be described with reference to FIGS. 2 to 12.

Figure 2:
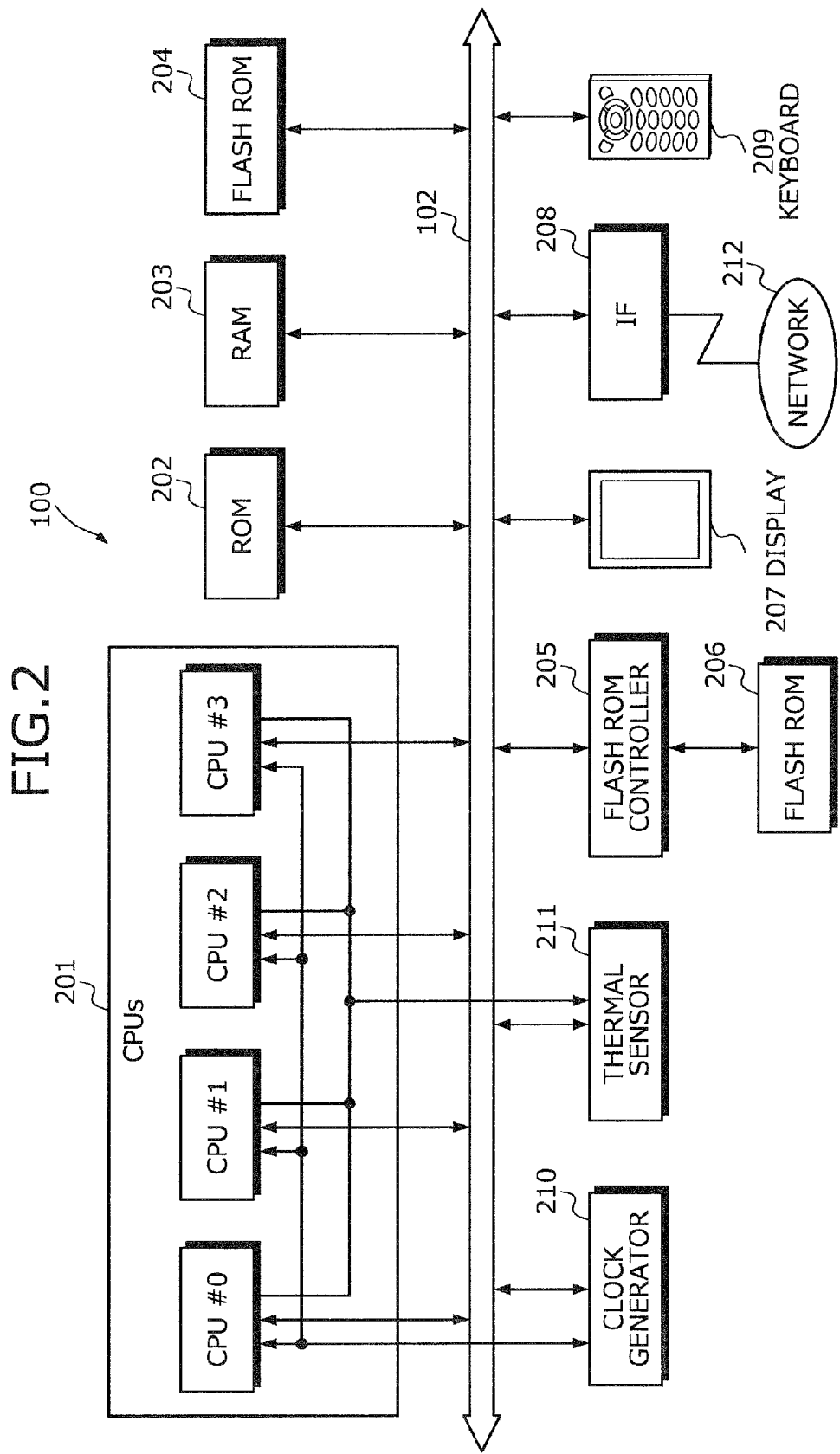
FIG. 2 is a block diagram of an example of a hardware configuration of the multicore processor system.

FIG. 2 is a block diagram of an example of a hardware configuration of the multicore processor system. In FIG. 2, the multicore processor system 100 assumed as a mobile terminal such as mobile telephone includes CPUs 201, read-only memory (ROM) 202, random access memory (RAM) 203, flash ROM 204, a flash ROM controller 205, and flash ROM 206. The multicore processor system 100 further includes a display 207, an interface (I/F) 208, a keyboard 209, a clock generator 210, and a thermal sensor 211. The shared memory 101 depicted in FIG. 1 is a storage device such as the RAM 203, the flash ROM 204, and the flash ROM 206. Further, the multicore processor system 100 may be applied to a telephone device such as a smartphone and PHS as well as a personal computer.

The CPUs 201 are a control device group that governs overall control of the multicore processor system 100. The CPUs 201 include CPUs #0 to #3. The CPUs 201 may include N CPUs, where N is an integer of 2 or more. The CPUs 201 may respectively have dedicated cache memory.

The ROM 202 is non-volatile memory storing programs such as a boot program. The RAM 203 is volatile memory used as a work area of the CPUs 201. The flash ROM 204 is re-writable, non-volatile memory and is, for example, a high-speed NOR type flash ROM enabling high speed reading. The flash ROM 204 stores system software such as an operating system (OS), and application software. For example, when the OS is updated, the multi-core processor system 200 receives a new OS via the IF 208 and updates the old OS that is stored in the flash ROM 204 with the received new OS.

The flash ROM controller 205, under the control of the CPUs 201, controls the reading and writing of data with respect to the flash ROM 206. The flash ROM 206 is re-writable, non-volatile memory and for example, stores data, has a primary purpose of portability, and may be, for example, NAND type flash ROM. The flash ROM 206 stores therein data written under control of the flash ROM controller 205. Examples of the data include image data and video data acquired by the user of the multi-core processor system through the IF 208, as well as a scheduling program according to the present embodiment. A memory card, SD card and the like may be adopted as the flash ROM 206.

The display 207 displays, for example, data such as text, images, functional information, etc., in addition to a cursor, icons, and/or tool boxes. A thin-film-transistor (TFT) liquid crystal display and the like may be employed as the display 207.

The IF 208 is connected to a network 212 such as a local area network (LAN), a wide area network (WAN), and the Internet through a communication line and is connected to other apparatuses through the network 212. The IF 208 administers an internal interface with the network 211 and controls the input and output of data with respect to external apparatuses. For example, a modem or a LAN adaptor may be employed as the IF 208.

The keyboard 209 includes, for example, keys for inputting letters, numerals, and various instructions and performs the input of data. Alternatively, a touch-panel-type input pad or numeric keypad, etc. may be adopted.

The clock generator 210 is a circuit that supplies a clock to each of the CPUs 201. The value of the clock frequency supplied by the clock generator 210 can be controlled by the CPUs 201. The thermal sensor 211 measures the temperature of each of the CPUs 201. In a method of measuring the CPU temperature, a value may be acquired from a thermal diode inside each CPU or a value may be acquired from a thermometer outside a package of each CPU. A measurement result is stored to the shared memory 101.

Figure 3:
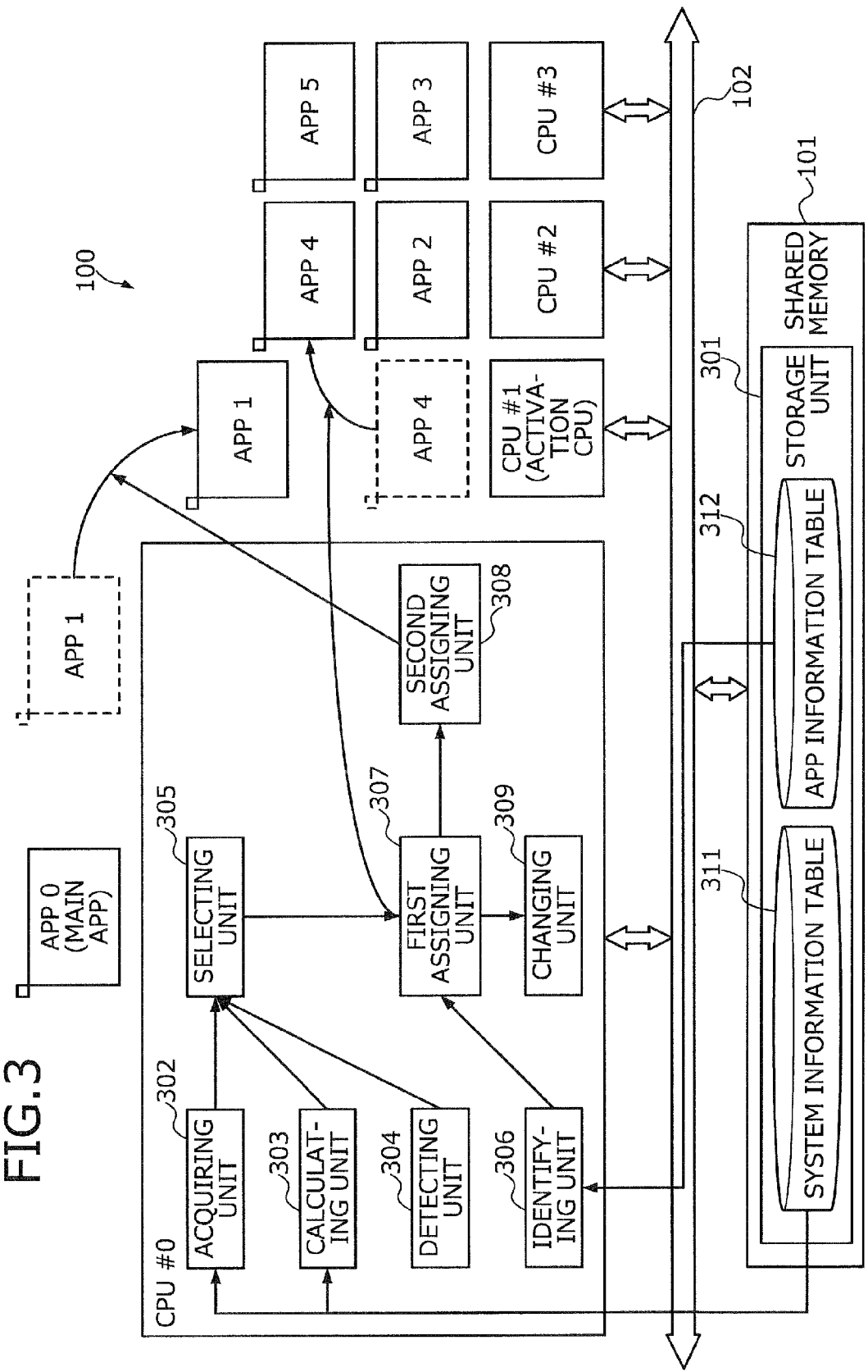
FIG. 3 is an explanatory view of a functional configuration example of the multicore processor system.

Functions of the multicore processor system 100 will be described. FIG. 3 is an explanatory view of a functional configuration example of the multicore processor system. The multicore processor system 100 includes a storage unit 301, an acquiring unit 302, a calculating unit 303, a detecting unit 304, a selecting unit 305, an identifying unit 306, a first assigning unit 307, a second assigning unit 308, and a changing unit 309. With regard to the acquiring unit 302 to the changing unit 309 acting as a control unit, functions of the acquiring unit 302 to the changing unit 309 are implemented by executing on a given CPU among the CPUs 201, a program stored in a storage device. In the description of FIG. 3, the CPU #0 executes the program. The storage device may be the ROM 202, the RAM 203, the flash ROM 204, and the flash ROM 206 depicted in FIG. 2, for example. Functions of the acquiring unit 302 to the changing unit 309 may be implemented by another CPU executing the program through the IF 208.

The multicore processor system 100 can access a system information table 311 and an app information table 312 included in the storage unit 301. The system information table 311 and the app information table 312 are included in the storage unit 301. The system information table 311 stores for each CPU, identification information of apps assigned to the CPU. Details of the system information table 311 will be described later with reference to FIG. 4. The app information table 312 stores time information indicating activation times of the apps assigned to the CPUs. Details of the app information table 312 will be described later with reference to FIG. 5. The system information table 311 and the app information table 312 are stored in the storage device such as the RAM 230, the flash ROM 204, and the flash ROM 206.

In the multicore processor system 100 depicted in FIG. 3, the CPU #0 has been assigned the app 1, the CPU #1 has been assigned the app 4, the CPU #2 has been assigned the app 2, and the CPU #3 has been assigned the apps 3 and 5. In FIG. 3, it is assumed that the app 1 is an app activated by a user operation. Although software to be scheduled by the scheduling program according to this embodiment is apps, the software may be basic software included in an OS as long as the software can be transferred to another CPU.

The acquiring unit 302 acquires a measurement result of CPU temperatures. The temperature of a CPU may be a temperature measured by thermal diode inside the CPU or may be a temperature outside a package of the CPU. For example, the acquiring unit 302 reads and acquires a measurement result of temperatures of CPUs from the shared memory 101 storing the result of CPU temperature measurements by the thermal sensor 211.

The acquiring unit 302 may acquire usage rates of the CPUs. The usage rate of a CPU is a proportion of the time while software assigned to the CPU occupies the CPU. For a specific usage rate of a CPU, a percentage of an execution time of a CPU per unit time is calculated as the usage rate. The function of the acquiring unit 302 enables the multicore processor system 100 to acquire a selection criterion for the activation CPU. Acquired results are stored to a storage area such as a register or cache memory of the CPU #0, the RAM 203, the flash ROM 204, and the flash ROM 206.

The calculating unit 303 refers to the system information table 311 to calculate for each CPU, the number of apps assigned to the CPU. For example, the calculating unit 303 performs the calculation and obtains one as the number of the apps assigned to the CPU #0, one as the number of the apps assigned to the CPU #1, one as the number of the apps assigned to the CPU #2, and two as the number of the apps assigned to the CPU #3. The calculating unit 303 may weight an app in performing the calculation. For example, information may be stored in the storage unit 301 to indicate that a certain app having a larger processing amount corresponds to two normal apps, and the calculating unit 303 may refer to the information to calculate the number of apps. The function of the calculating unit 303 enables the multicore processor system 100 to calculate a selection criterion for the activation CPU. Calculation results are stored to a storage area such as the register or the cache memory of the CPU #0, the RAM 203, the flash ROM 204, and the flash ROM 206.

The detecting unit 304 detects that an activation process of an app indicated in an activation request has been completed. For example, the detecting unit 304 detects that the activation process of the app 1 specified by the activation request has been completed.

The detecting unit 304 may detect that execution of a user-operated app has been terminated. A user-operated app is an app operated by a user. A user-operated app will hereinafter be referred to as a main app. For example, the CPU #0 detects that the execution of the app 0, which is a main app has been terminated. The function of the detecting unit 304 enables the multicore processor system 100 to detect a trigger to select an activation CPU or a trigger to identify a main app. Detection results are stored to a storage area such as the register or the cache memory of the CPU #0, the RAM 203, the flash ROM 204, and the flash ROM 206.

The selecting unit 305 selects a CPU among multiple CPUs. For example, selecting unit 305 selects the CPU #1 as the activation CPU among the CPUs #0 to #3. For example, the selecting unit 305 may select a CPU in a fixed sequence such that the CPU #0 is initially selected before selecting the CPU #1 at the next selection opportunity, or may randomly select a CPU from among the CPUs #0 to #3.

The selecting unit 305 may select a CPU based on the measurement result of temperatures of the CPUs acquired by the acquiring unit 302. For example, the selecting unit 305 may select, as the activation CPU, the CPU having the highest temperature of the acquired CPU temperatures. The selecting unit 305 may calculate a temporal change in the temperature measurement result of each CPU and may select the CPU having the highest degree of increase in temperature as the activation CPU. The selecting unit 305 may select, as the activation CPU, the CPU attaining a temperature equal to or greater than a tolerable temperature specified by a developer of the multicore processor system 100. If multiple CPUs attain the tolerable temperature or higher, the selecting unit 305 may select the CPU having the higher degree of increase in temperature or may select the CPU maintaining the tolerable temperature or higher for a longer time.

The selecting unit 305 may select a CPU based on the usage rates of cores acquired by the acquiring unit 302. For example, the selecting unit 305 may select the CPU having the largest usage rate as the activation CPU. The selecting unit 305 may calculate a temporal change in the usage rate and may select the CPU having the highest degree of increase in the usage rate as the activation CPU.

The selecting unit 305 selects a CPU based on the number of apps of each CPU, calculated by the calculating unit 303. For example, the selecting unit 305 may select, as the activation CPU, the CPU having the largest calculated number of apps. Alternatively, when the number of apps in the CPU having the largest number of apps and the next largest number of apps are equal to or less than a predetermined threshold value, the selecting unit 305 may select the activation CPU by using the temperature and the usage rate acquired by the acquiring unit 302.

If the detecting unit 304 detects that an activation process has been completed, the selecting unit 305 may select a CPU from among multiple CPUs. For example, if the detecting unit 304 detects the completion of the activation process of the app 1, the selecting unit 305 selects a CPU from among the CPUs #0 to #3, as the activation CPU. The function of the selecting unit 305 enables the multicore processor system 100 to preliminarily determine a CPU to be dedicated for the activation process. The identification information of the selected CPU is stored in a storage area such as a register or cache memory of the CPU #0, the RAM 203, the flash ROM 204, and the flash ROM 206.

The identifying unit 306 refers to the app information table 312 to identify a main app among the apps assigned to the CPUs. The activation time of an app may be the time when an activation request is accepted, the time when an activation process is started, or the time when an activation process is completed. For example, the identifying unit 306 identifies the app having the latest app activation time as the main app. Alternatively, the app information table 312 may store the activation times of apps of the previous day or earlier and the identifying unit 306 may identify, as the main app, the app having the activation time closest to the current time in the past direction. As a result, the identifying unit 306 can identify, as the main app, an app that is always activated at the same time.

The app information table 312 stores the number of times of each app has been activated and the identifying unit 306 may identify, as the main app, the app that has been activated the most number of times. The identifying unit 306 may identify, as the main app, the app set at the foreground.

If the detecting unit 304 detects that the execution of the main app has ended, the identifying unit 306 may refer to the app information table 312 to identify a new main app among the apps assigned to the CPUs. For example, if the detecting unit 304 detects that the execution of the app 0, which has been identified as the main app, has been terminated, the identifying unit 306 refers to the app information table 312 to identify a new main app among the apps 1 to 5. The function of the identifying unit 306 enables the multicore processor system 100 to identify an app for which it is desirable to have no other app concurrently assigned. The identification information of the identified app is stored in a storage area such as a register or the cache memory of the CPU #0, the RAM 203, the flash ROM 204, and the flash ROM 206.

The first assigning unit 307 refers to the system information table 311 to assign an app that has been assigned to the CPU selected by the selecting unit 305, to a CPU other than the selected CPU among the CPUs. For example, it is assumed that the selecting unit 305 selects the CPU #1. In this case, the first assigning unit 307 refers to the system information table 311 to identify the app 4 assigned to the CPU #1. The first assigning unit 307 then assigns the app 4 to a CPU other than the CPU #1 among the CPUs #0 to #3. In the example depicted in FIG. 3, the first assigning unit 307 assigns the app 4 to the CPU #2.

The first assigning unit 307 refers to the system information table 311 to identify the CPU assigned with the main app identified by the identifying unit 306. The first assigning unit 307 may then assign another app other than the main app assigned to the identified CPU, to a CPU other than the CPU to which the main app has been assigned, among the other CPUs. The other CPUs in this case are the other CPUs that are not the activation CPU among the multiple CPUs.

For example, it is assumed that the main app identified by the identifying unit 306 is the app 1 and that the CPU to which the app 1 has been assigned is the CPU #0. Although not depicted in FIG. 3, it is assumed that an app 6 has been assigned to the CPU #0. In this case, the first assigning unit 307 assigns the app 6 to either the CPU #2 or the CPU #3, which are the CPUs other than the CPU #0 to which the app 1 has been assigned and the CPU #1 that is the activation CPU.

If the identifying unit 306 identifies a new main app, the first assigning unit 307 may assign the new main app to the CPU that was assigned with the main app. For example, if the execution of the app 0 defined as the main app assigned to the CPU #0 is terminated and the app 2 is identified as a new main app, the first assigning unit 307 assigns the app 2 to the CPU #0.

If the identifying unit 306 identifies a new main app, the first assigning unit 307 identifies the CPU to which the new main app is assigned. The first assigning unit 307 may then assign an app other than the new main app assigned to the identified CPU, to a CPU other than the identified CPU among the other CPUs. For example, it is assumed that the execution of the app 0 defined as the main app assigned to the CPU #0 is terminated and that the identifying unit 306 identifies the app 2 as a new main app. In this case, the first assigning unit 307 assigns the app 4 that is the app other than the app 2 assigned to the CPU #2, to either the CPU #0 or the CPU #3, which are the CPUs other than the CPU #2 to which the app 2 is assigned and the CPU #1 that is the activation CPU.

The function of the first assigning unit 307 removes the app assigned to the activation CPU and therefore, enables the multicore processor system 100 to dedicate the activation CPU for the activation process.

If an activation request for an app is accepted, the second assigning unit 308 assigns the app specified by the activation request to a selected CPU consequent to the first assigning unit 307 assigning the app assigned to the CPU selected by the selecting unit 305 to another CPU. Since the first assigning unit assigns the app assigned to the selected CPU to another CPU, the selected CPU no longer has an assigned app. For example, if the app specified by the activation request is the app 1, the second assigning unit 308 assigns the app 1 to the CPU #1 that is the activation CPU. The function of the second assigning unit 308 assigns the app to the CPU capable of specializing in the activation process, enabling the activation process to be performed faster and improving performance for the user.

If the first assigning unit 307 assigns the app assigned to the CPU selected by the selecting unit 305 to another CPU, the changing unit 309 lowers the value of the clock frequency of the selected CPU. For example, it is assumed that the first assigning unit 307 assigns to the CPU #2, the app 4 that has been assigned to the CPU #1 selected as the activation CPU. In this case, the changing unit 309 changes the value of the clock frequency of the CPU #1 to a value lower than the current value. The value of the clock frequency after the change may be the lowest clock frequency that can be set by the CPU #1.

If the app specified by the activation request is assigned to the selected CPU, the changing unit 309 changes the value of the clock frequency of the selected CPU to a value enabling the activation of the app specified by the activation request. The clock frequency enabling the activation of the app may be the same clock frequency for all the apps. Alternatively, a clock frequency enabling the activation may be stored for each app in the app information table 312 and the changing unit 309 may refer to the app information table 312 to change the clock frequency.

FIG. 4 is an explanatory view of an example of the contents of the system information table. The system information table 311 stores information for the CPUs. The system information table 311 depicted in FIG. 4 stores records 401-1 to 401-4.

The system information table 311 includes five field for CPU IDs, clock frequencies, activation CPU flags, assigned apps, and temperatures. The CPU ID field stores identification information identifying a CPU. The clock frequency field stores a clock frequency set for the corresponding CPU. The activation CPU flag field stores an identifier indicating whether the CPU is the activation CPU. For example, if the activation CPU flag field stores "1" as the identifier, this means that the corresponding CPU is the activation CPU.

The assigned app field stores a list of apps assigned to the corresponding CPU. The temperature field stores the temperature of the corresponding CPU.

For example, the record 401-1 is for the CPU #0 having the CPU ID of #0 and indicates that the clock frequency is $f_{overclock}$, that the CPU is not the activation CPU, that the assigned app is the app 0, and that the temperature is $T_{low}$. It is noted that $f_{overclock}$ is an overclocked clock frequency.

In the record 401-2, $f_{low}$ is the clock frequency at which the operation of the CPU is at least assured. In the records 401-3 and 401-4, $f_{other}$ is a clock frequency other than $f_{overclock}$ and $f_{low}$. A relationship of $f_{other}$, $f_{overclock}$ and $f_{low}$ is described later with reference to FIG. 14. $T_{low}$ and $T_{high}$ indicate that $T_{high}$ is a temperature higher than $T_{low}$. Therefore, in FIG. 4, the temperature of the CPU #1 is the highest among the CPUs #0 to #3.

FIG. 5 is an explanatory view of an example of the contents of the app information table. The app information table 312 stores information for the apps. The app information table 312 depicted in FIG. 5 stores records 501-1 to 501-4.

The app information table 312 includes three fields for app IDs, activation times, and main app flags. The app ID field stores identification information identifying an app. The activation time field stores the time of activation of the corresponding app. The main app flag field stores an identifier indicating whether the corresponding app is the main app. For example, if the main app flag field stores "1" as the identifier, this indicates that the corresponding app is the main app. For example, the record 501-1 is for the app 0 and indicates that the activation time is "mm/dd/hh:mm:ss" and that the app 0 is the main app.

Figure 6:
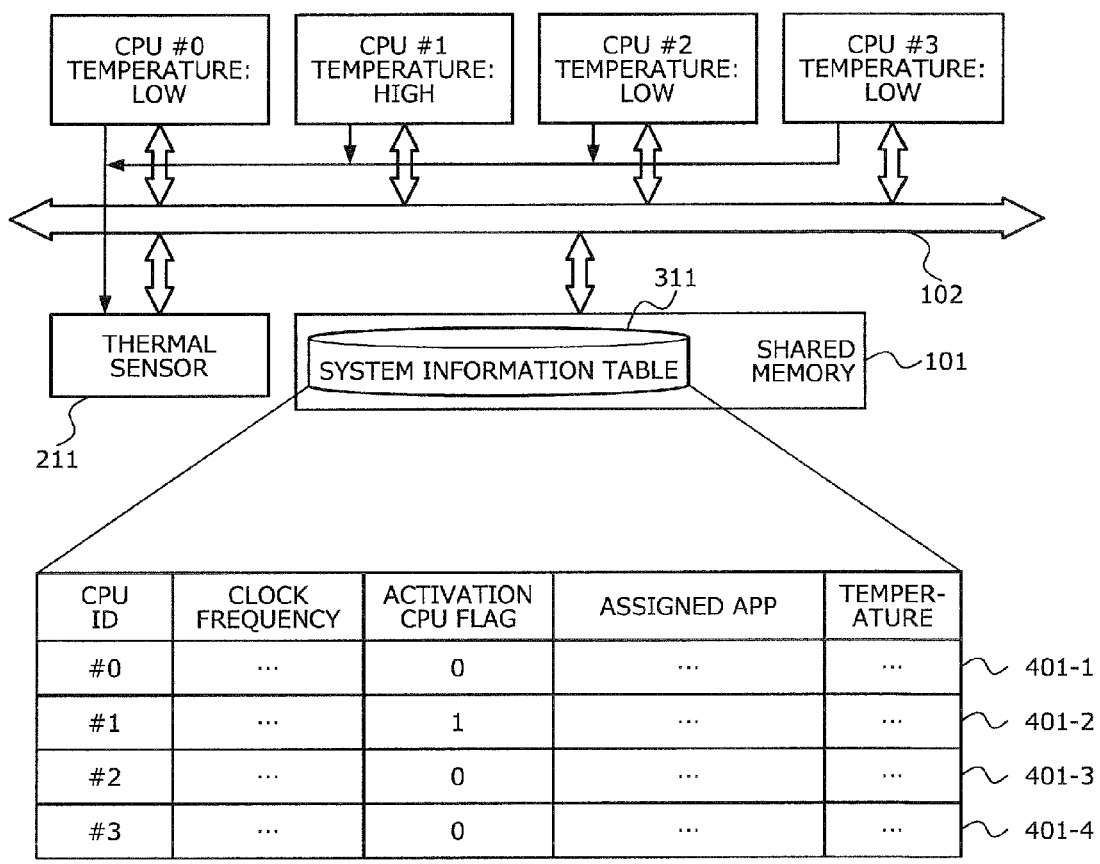
FIG. 6 is an explanatory view of an example of a method of selecting an activation CPU.

FIG. 6 is an explanatory view of an example of a method of selecting an activation CPU. The CPU #0 acquires temperature measurement results for the CPUs, measured by the thermal sensor 211. For example, in the example of FIG. 6, the CPU #0 acquires the temperatures of the CPUs #0 to #3. It is assumed that among the acquired temperatures, the CPU #1 has the highest temperature while the CPUs #0, #2, and #3 have lower temperatures.

In this case, the CPU #0 selects the CPU #1 having the highest temperature as the activation CPU. In the system information table 311, the CPU #0 then sets "1" in the activation CPU flag field of the record 401-2 storing information of the CPU #1. The CPU #0 sets "0" in the activation CPU flag fields of the records 401-1, 401-3, and 401-4.

Selection of the activation CPU occurs at the following four timings. The first timing is when a system is activated. The second timing is when activation of an app is completed. The third timing is when the CPU temperature of any of the CPUs #0 to #3 reaches a pre-specified tolerable temperature. A fourth timing is when execution of the main app is terminated. An operation example of a scheduling process will be described with reference to FIGS. 7 to 10.

Figure 7:
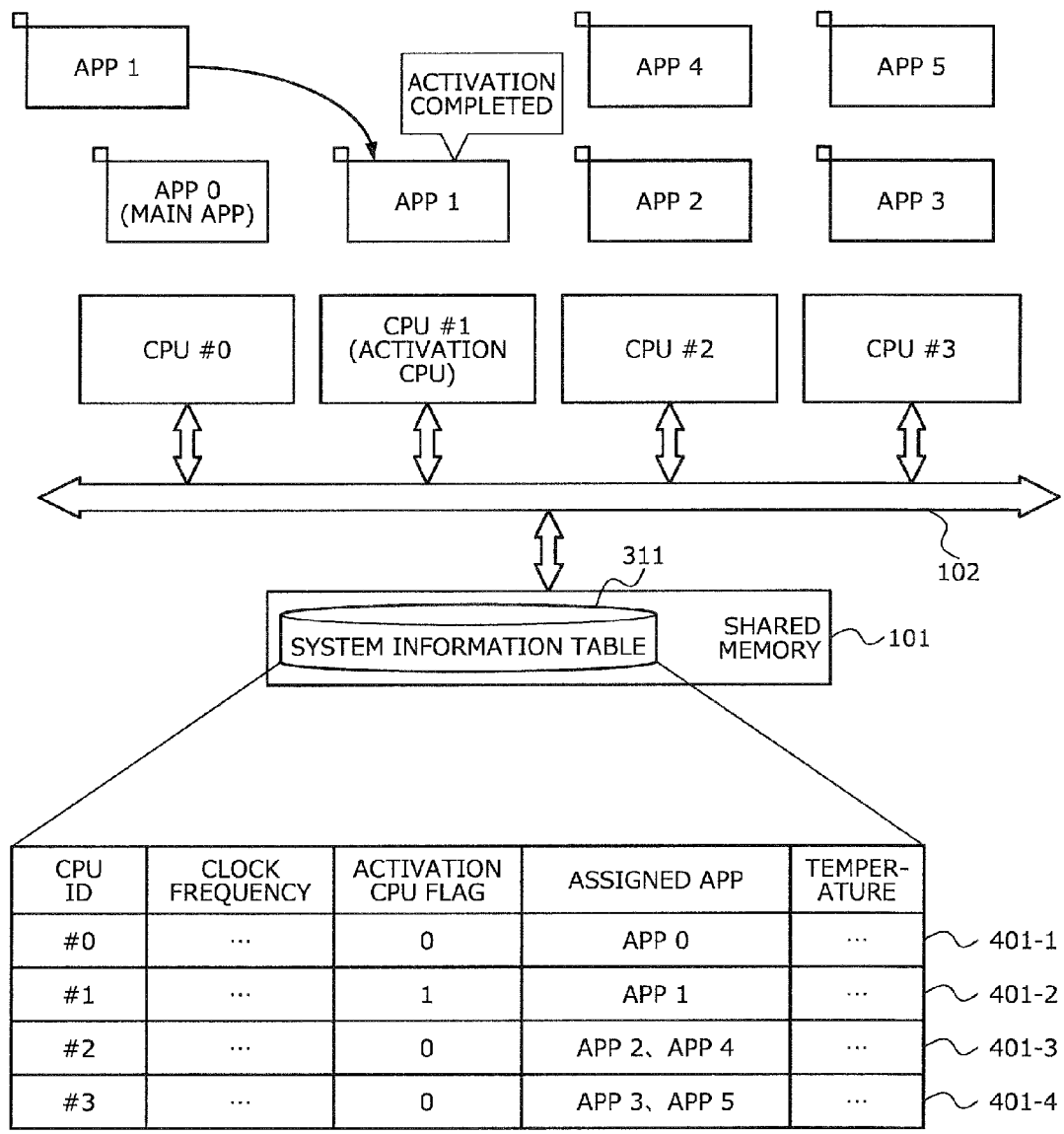
FIG. 7 is an explanatory view (part one) of an operation example of a scheduling process.

FIG. 7 is an explanatory view (part one) of an operation example of the scheduling process. In the multicore processor system 100 depicted in FIG. 7, the app 0 is assigned to the CPU #0, the apps 2 and 4 are assigned to the CPU #2, and the apps 3 and 5 are assigned to the CPU #3.

In this state, the CPU #0 activates the app 1 according to a user operation. The CPU #0 assigns the app 1 to the CPU #1 that is the activation CPU. The CPU #1 executes the activation process of the app 1. After completing the activation of the app 1, the CPU #0 updates the system information table 311. For example, the CPU #0 stores "app 1" into the assigned app field of the record 401-2.

Figure 8:
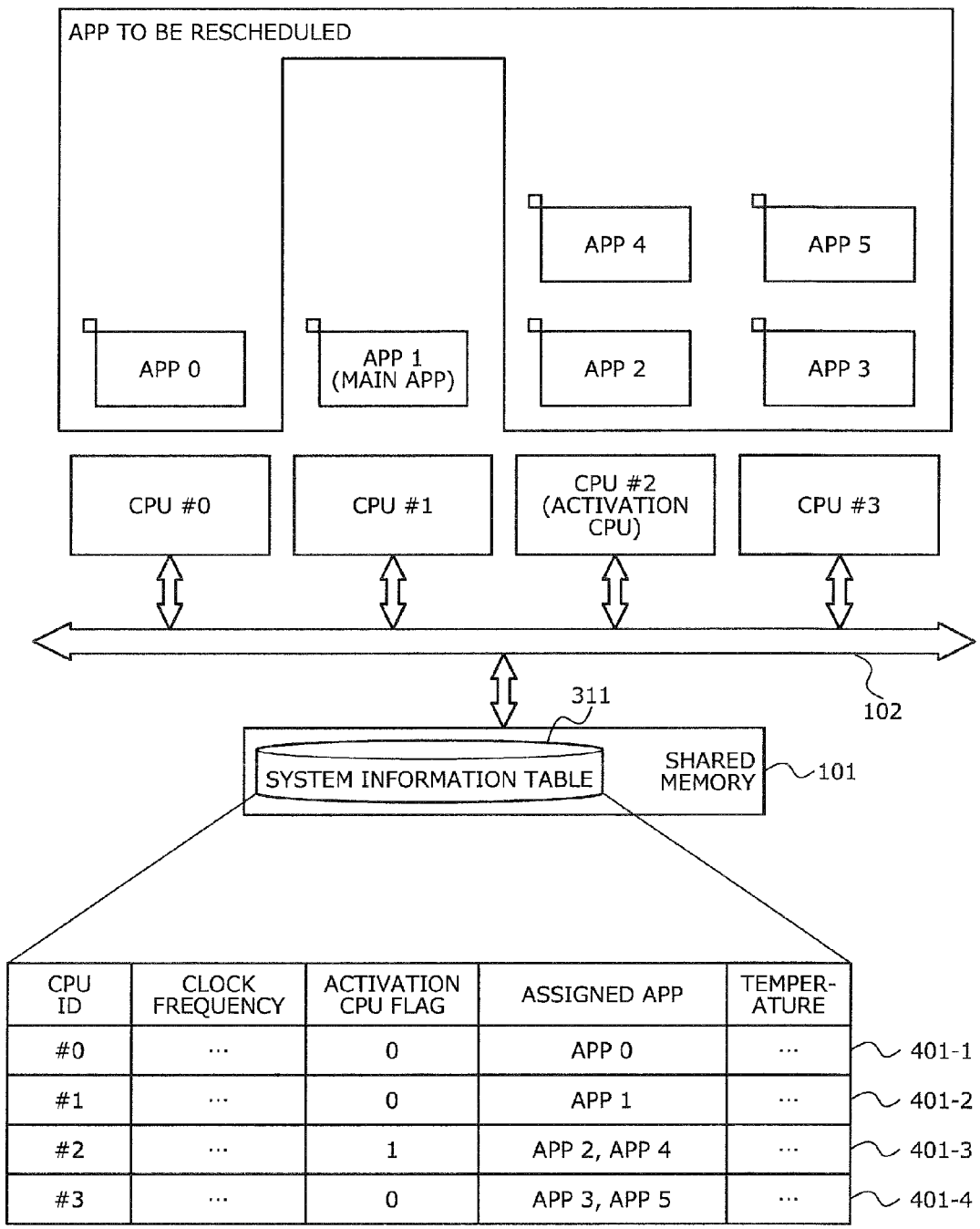
FIG. 8 is an explanatory view (part two) of an operation example of the scheduling process.

FIG. 8 is an explanatory view (part two) of an operation example of the scheduling process. The multicore processor system 100 depicted in FIG. 8 is in a state when the activation of the app 1 has been completed. In this state, the CPU #0 selects a new activation CPU. In the state depicted in FIG. 8, the CPU #0 selects, as the activation CPU, the CPU #2, which has the highest temperature. In the system information table 311, the CPU #0 then sets "1" in the activation CPU flag field of the record 401-3 storing information of the CPU #2. The CPU #0 sets "0" in the activation CPU flag fields of the records 401-1, 401-2, and 401-4.

The CPU #0 sets the apps other than the app 1 defined as the main app, i.e., the app 0 and 2 to 5, as apps to be rescheduled, and executes a rescheduling process for the apps to be rescheduled.

The state described with reference to FIG. 8 corresponds to the second timing depicted in FIG. 6, i.e., when activation of an app has been completed. If the state of FIG. 8 corresponds to the first timing, i.e., when a system is activated, the CPU #0 selects, for example, the CPU having the highest temperature as the activation CPU and executes the update process of the system information table 311 depicted in FIG. 8 and the rescheduling process. If the state of FIG. 8 corresponds to the third timing, i.e., when a CPU temperature reaches the tolerable temperature, the CPU #0 selects, as the activation CPU, the CPU that has reached the tolerable temperature and executes the update process of the system information table 311 and the rescheduling process. The case of the fourth timing will be described later with reference to FIG. 10.

Figure 9:
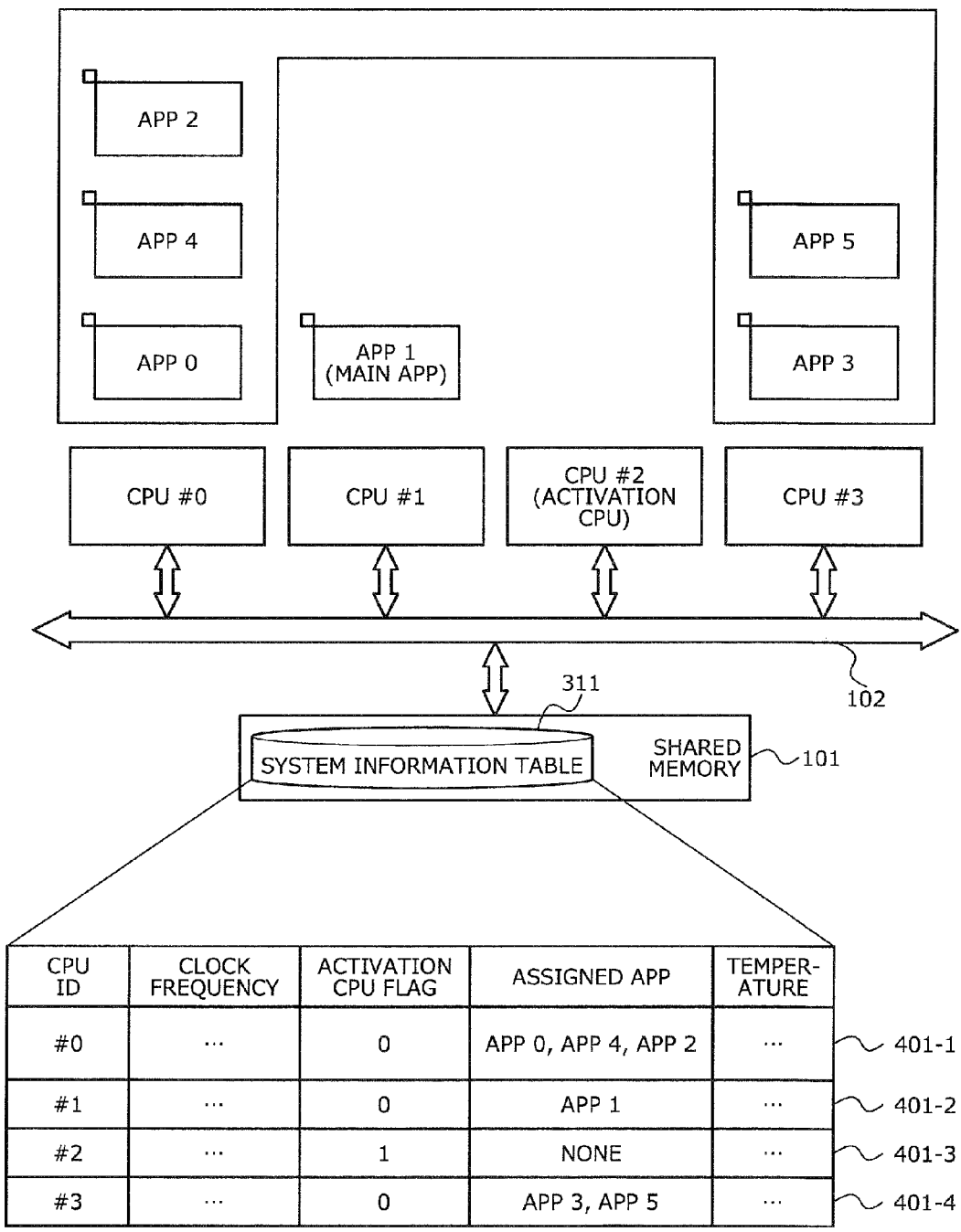
FIG. 9 is an explanatory view (part three) of an operation example of the scheduling process.

FIG. 9 is an explanatory view (part three) of an operation example of the scheduling process. The multicore processor system 100 depicted in FIG. 9 is in a state after the rescheduling process is executed for the apps to be rescheduled and depicted in FIG. 8. For example, the CPU #0 assigns the apps 2 and 4, which were assigned to the CPU #2, to the CPU #0.

The CPU #0 updates the assigned app field of the system information table 311. For example, the CPU # stores "app 0", "app 4", and "app 2" into the assigned app field of the record 401-1. The CPU #0 sets the assigned app field of the record 401-3 to a blank. The storage contents of the assigned app field of the records 401-2 and 401-4 are the same as those depicted in FIG. 8.

Figure 10:
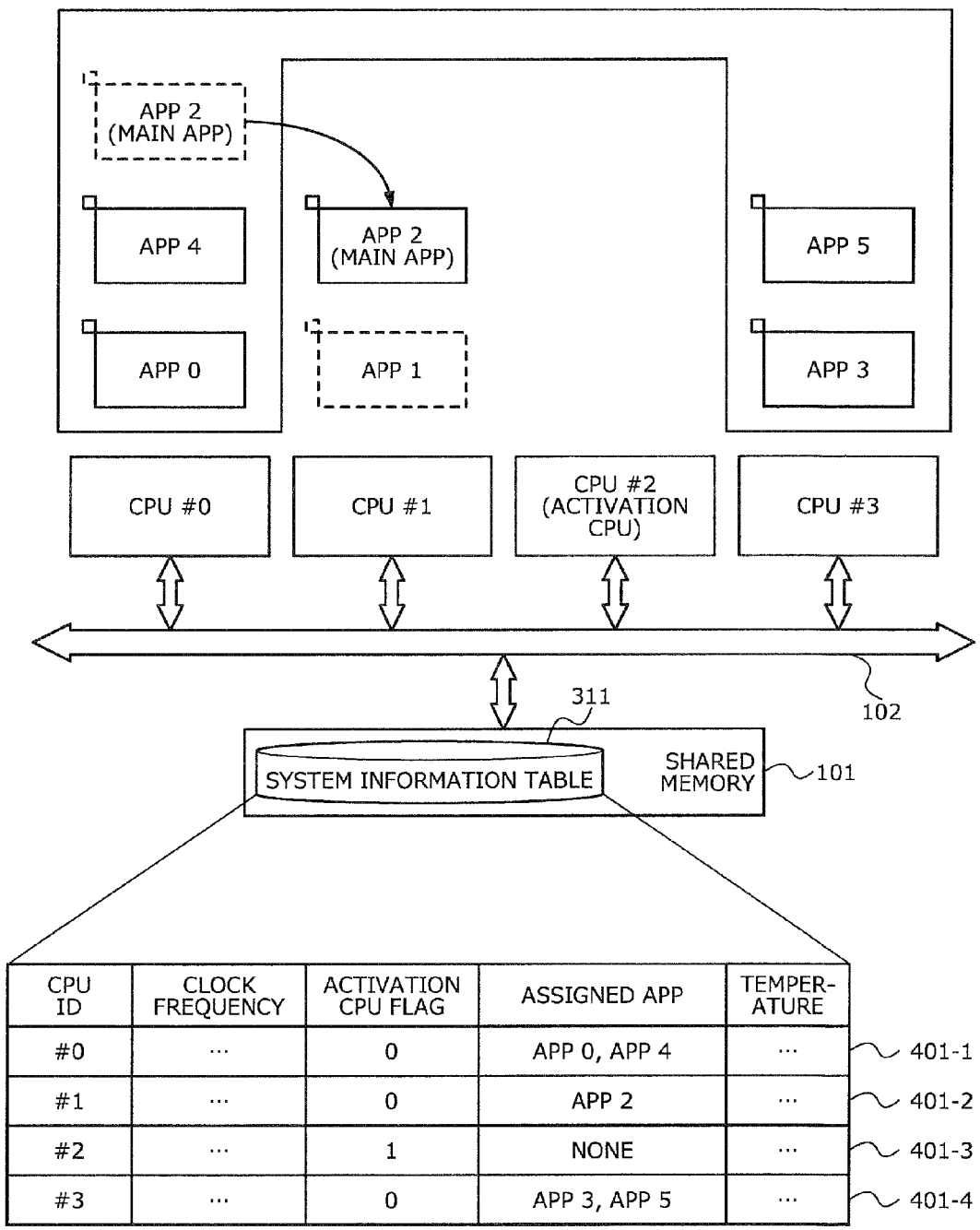
FIG. 10 is an explanatory view (part four) of an operation example of the scheduling process.

FIG. 10 is an explanatory view (part four) of an operation example of the scheduling process. The multicore processor system 100 depicted in FIG. 10 is in a state where the execution of the app 1, which is the main app, has been terminated after the state depicted in FIG. 9. In this case, the CPU #0 identifies a new main app from the apps assigned to the CPUs. For example, the CPU #0 identifies the app 2 having the latest activation time as the main app among the apps 0 and 2 to 5.

The CPU #0 performs setting such that no app other than the app 2 is assigned to the CPU to which the app 2 identified as the main app has been assigned. In FIG. 10, the CPU #0 transfers the app 2 to the CPU #1 to which the app 1, which was the main app, was assigned. The CPU #0 updates the assigned app field of the system information table 311. For example, the CPU #0 stores "app 0" and "app 4" into the assigned app field of the record 401-1. The CPU #0 stores "app 2" into the assigned app field of the record 401-2.

In FIG. 10, the CPU #0 transfers the app 2 to the CPU #1 to which the app 1, which was the main app, was assigned, to perform setting such that no app other than the app 2 is assigned to the CPU assigned with the app 2. In another assigning method, other than the app 2, the CPU #0 may assign the apps 0 and 4 assigned to the CPU #0 to a CPU other than the CPUs #0 and #2.

An example of changing the clock frequency in association with setting of the activation CPU will be described with reference to FIGS. 11 to 14. An example of changing the clock frequency in association with resetting of the activation CPU will be described with reference to FIGS. 15 and 16.

Figure 11:
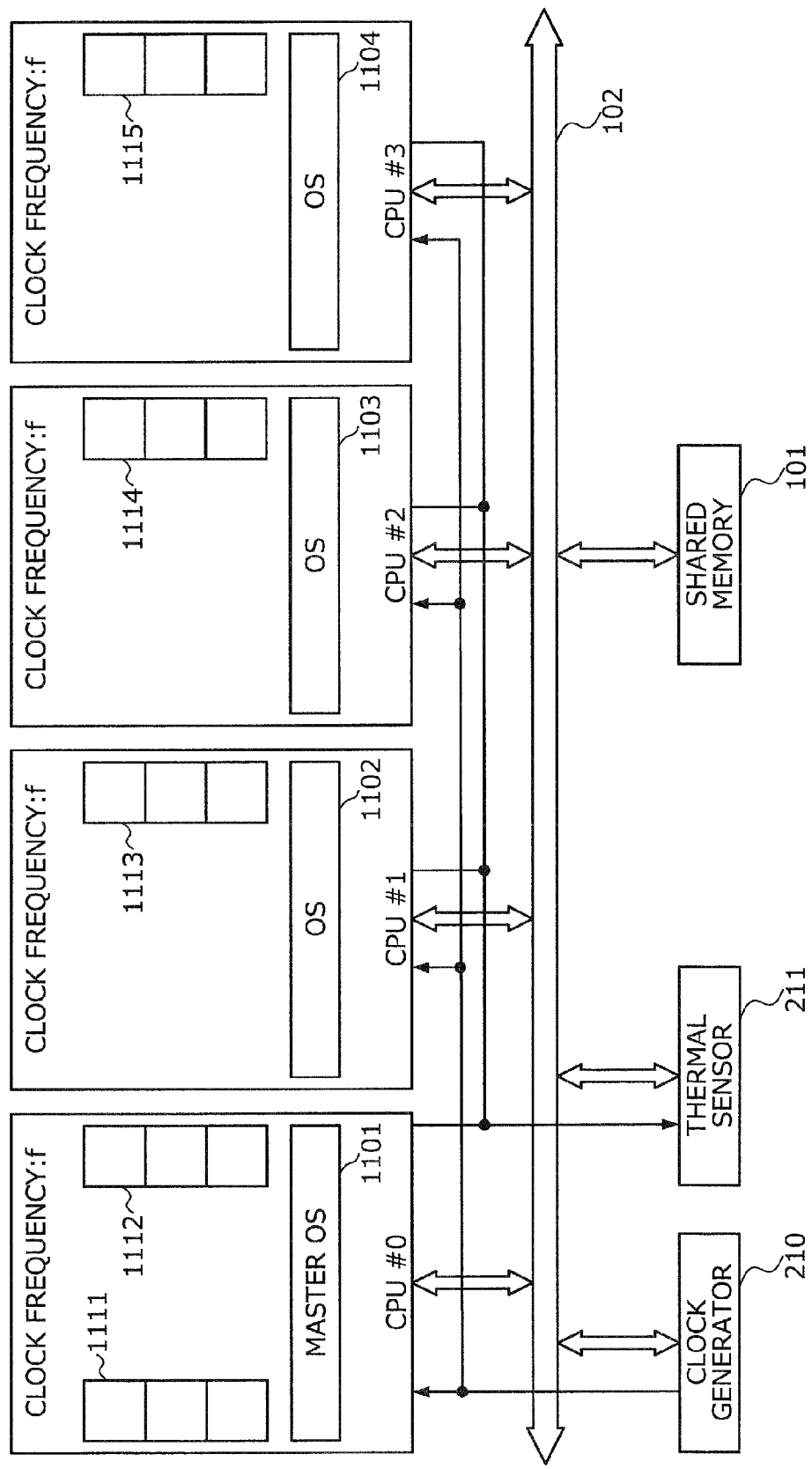
FIG. 11 is an explanatory view (part one) of an example of changing the clock frequency in association with setting of the activation CPU.

FIG. 11 is an explanatory view (part one) of an example of changing the clock frequency in association with setting of the activation CPU. First, in the description common to FIGS. 11 to 15, the CPU #0 acts as a master CPU and executes a master OS 1101. The CPUs #1 to #3 execute OSs 1102, 1103, and 1104, respectively. The CPU #0 can access a wait queue 1111 and a run queue 1112 as storage areas accessed by the master OS 1101. The CPUs #1 to #3 can access run queues 1113, 1114, and 1115, respectively, as storage areas accessed by the respective OSs 1102 to 1104. For example, configuration may be such that the wait and run queues 1111 to 1115 reside in the cache memory of the respective accessing CPUs and reside in the shared memory 101.

The master OS 1101 is responsible for general control of the multicore processor system 100. The master OS 1101 is responsible for control of the CPU #0. For example, the master OS 1101 assigns to any of the CPUs #0 to #3, an app that is an object of an activation instruction from a user. The OSs 1102 to 1104 are responsible for control of the CPUs.

The wait queue 1111 is a storage area that receives an activation instruction and stores identification information of apps waiting for the activation process. A function of the master OS causes the CPU #0 to assign inserted apps to the CPUs in the order in which the apps were inserted into the wait queue 1111. The run queues 1112 to 1115 store identification information of the apps assigned to the CPUs. The CPUs fetch the apps to be executed thereby, one by one, from the run queues and execute the fetched apps to realize multitask processing. The CPUs #0 to #3 depicted in FIG. 11 are operated with the value of the clock frequency set to f under the control of the clock generator 210.

Figure 12:
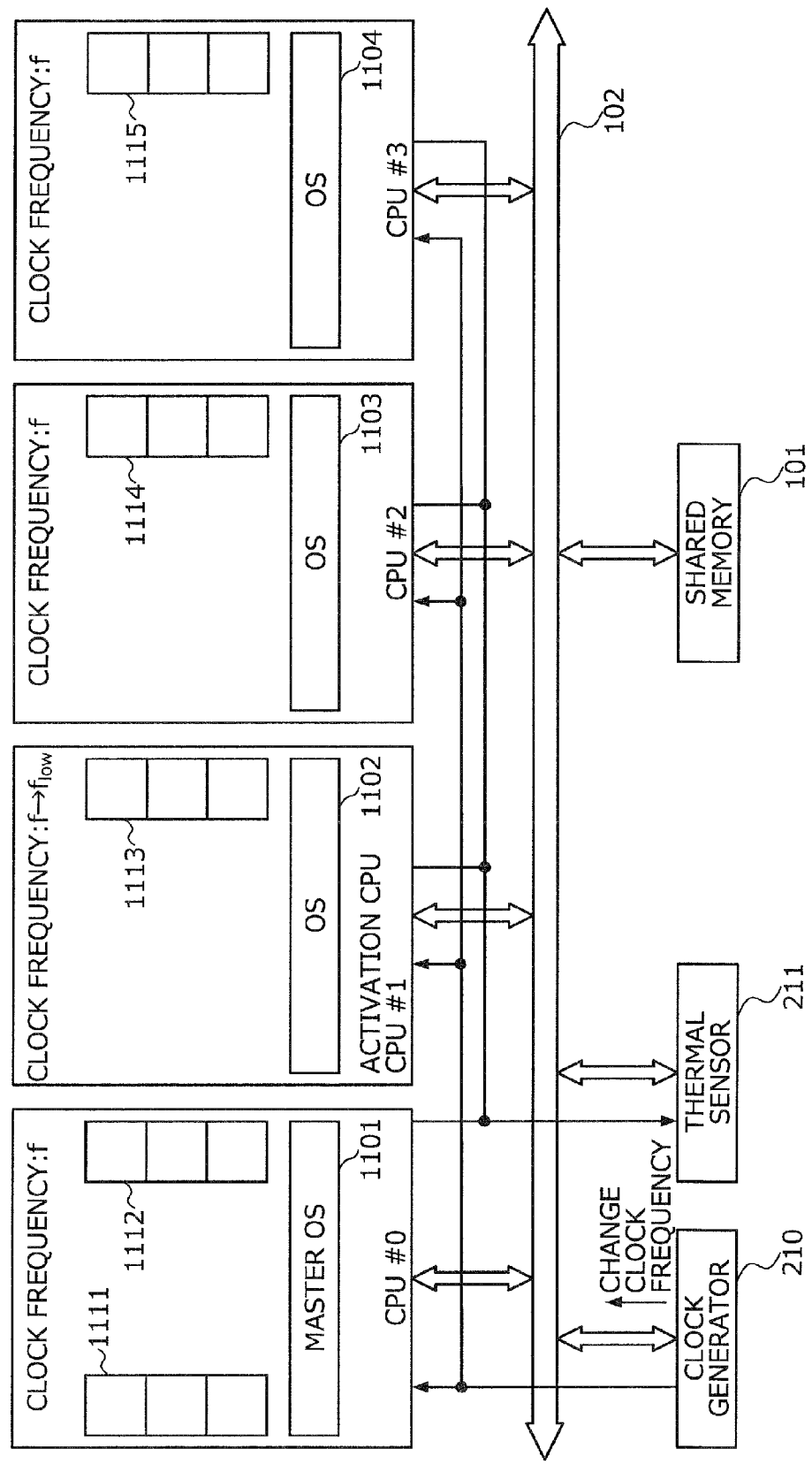
FIG. 12 is an explanatory view (part two) of the example of changing the clock frequency in association with setting of the activation CPU.

FIG. 12 is an explanatory view (part two) of the example of changing the clock frequency in association with setting of the activation CPU. The multicore processor system 100 depicted in FIG. 12 is in a state when the activation CPU is selected from the state depicted in FIG. 11. The CPU #0 selects the CPU #1 as the activation CPU among the CPUs #0 to #3, according to the temperatures of the CPUs measured by the thermal sensor 211.

The CPU #0 controls the clock generator 210 to change the clock frequency of the CPU #1 from f to $f_{low}$. It is noted that $f_{low}$ is the lowest clock frequency at which the CPU #1 can operate.

Figure 13:
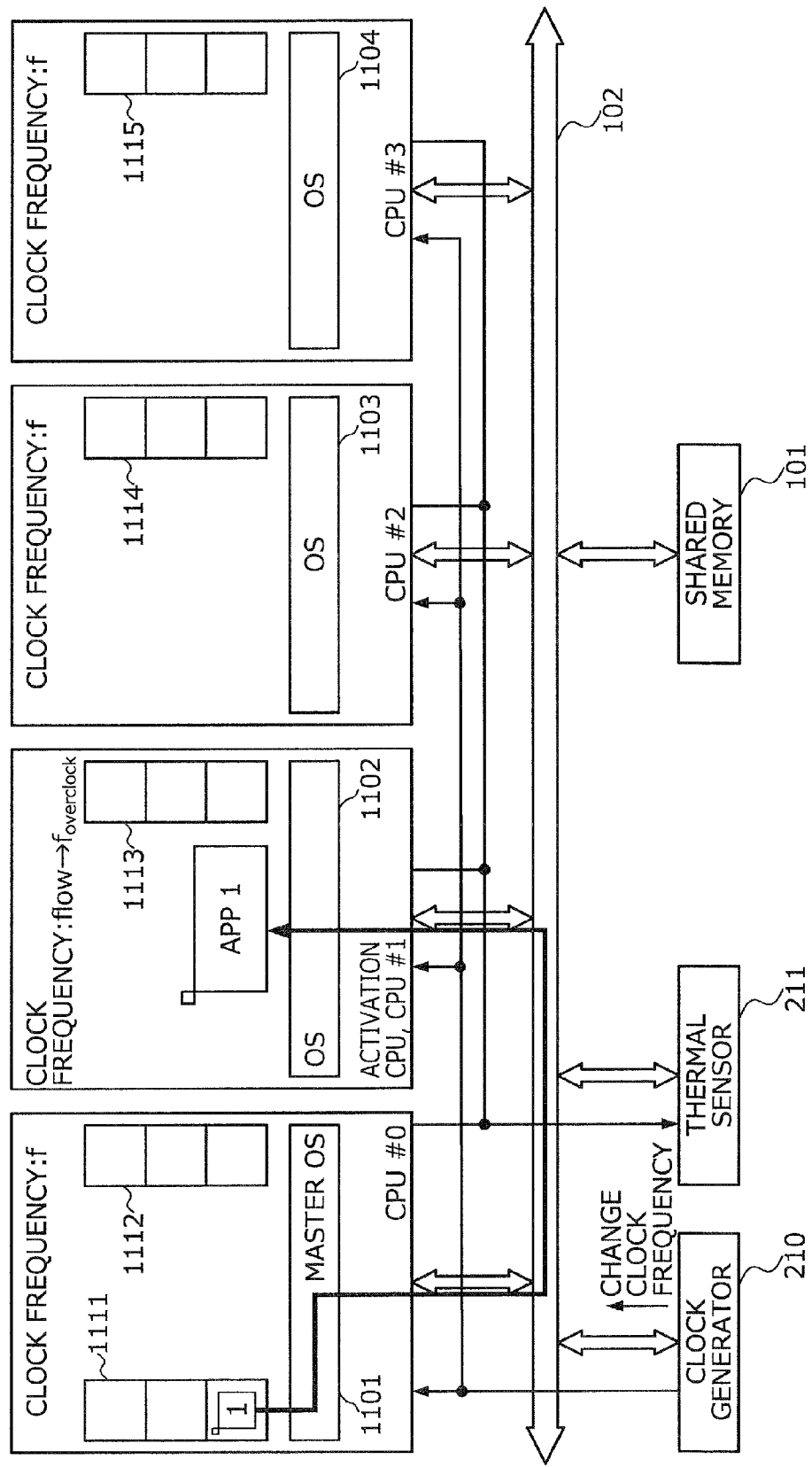
FIG. 13 is an explanatory view (part three) of the example of changing the clock frequency in association with setting of the activation CPU.

FIG. 13 is an explanatory view (part three) of the example of changing the clock frequency in association with setting of the activation CPU. The multicore processor system 100 depicted in FIG. 13 represents a transition from the state depicted in FIG. 12 to a state when the activation request of the app 1 is accepted consequent to a user operation. The CPU #0 stores the identification information of the app 1 into the wait queue 1111.

The CPU #0 assigns the app 1 to the CPU #1 selected as the activation CPU. The CPU #0 controls the clock generator 210 to change the value of the clock frequency of the CPU #1 from $f_{low}$ to $f_{overclock}$. It is noted that $f_{overclock}$ is a value of the clock frequency higher than the normally set clock frequency.

Figure 14:
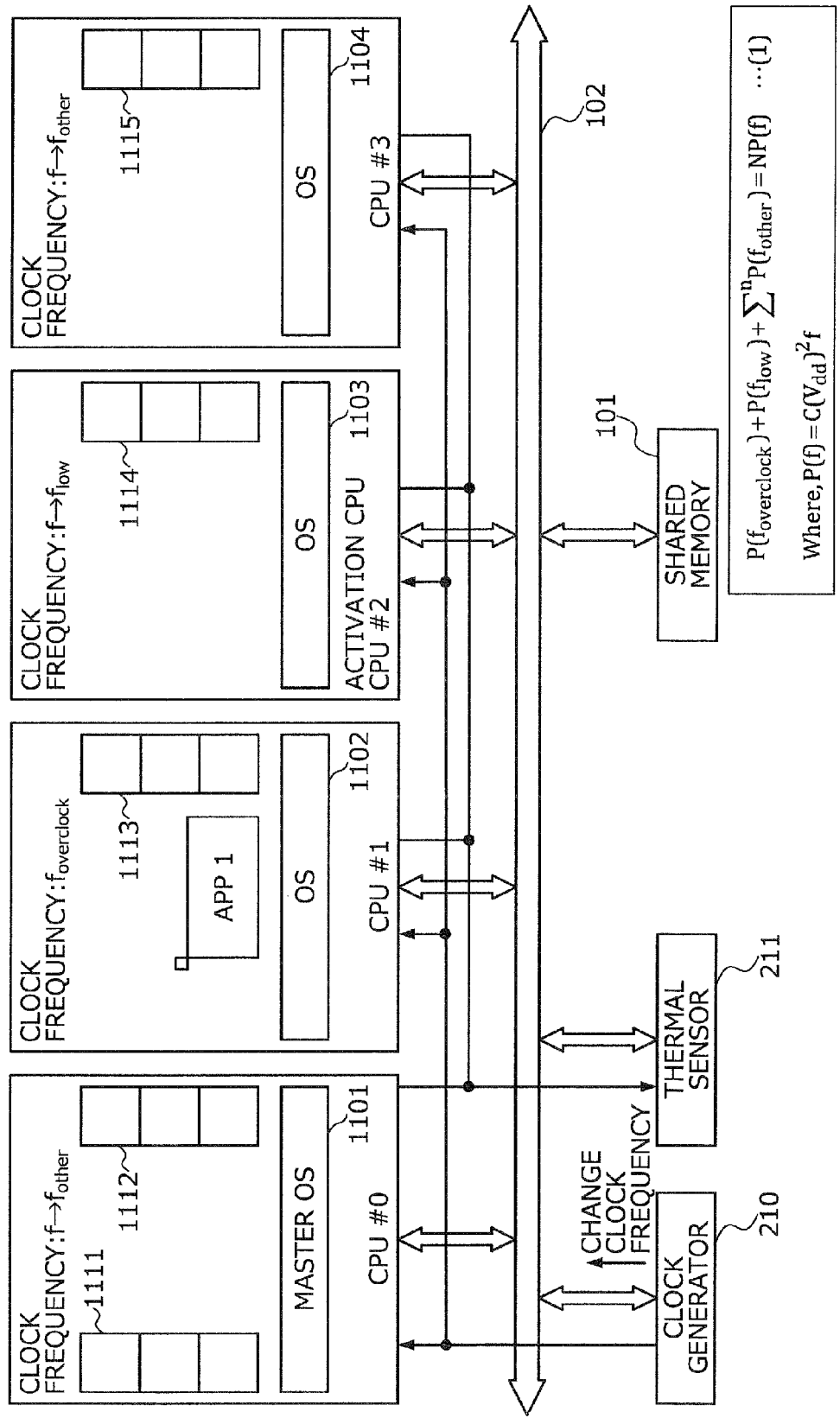
FIG. 14 is an explanatory view (part four) of the example of changing the clock frequency in association with setting of the activation CPU.

FIG. 14 is an explanatory view (part four) of the example of changing the clock frequency in association with setting of the activation CPU. The multicore processor system 100 depicted in FIG. 14 represents a transition from the state depicted in FIG. 13 to a state when the activation process of the app 1 is completed. As the activation CPU, the CPU #0 selects the CPU #2, which has the highest temperature among the CPUs #0 to #3.

The CPU #0 controls the clock generator 210 to change the clock frequency of the CPU #2 from f to $f_{low}$. The CPU #0 controls the clock generator 210 to change the values of the clock frequencies of the CPUs #0 and #3 from f to $f_{other}$.

Consequent to the clock frequency value of the CPU #1 being changed to $f_{overclock}$, the power consumption of the multicore processor system 100 may increase. Therefore, the multicore processor system 100 depicted in FIG. 14 changes the clock frequency of the CPUs #0, #2, and #3 to suppress increases in power consumption of the multicore processor system 100. When a CPU power supply voltage is $V_{dd}$ and C is a proportional constant, CPU power consumption P(f) can be represented by the following equation.

$$P(f)=C(V_{dd})^2 f$$

The CPU #0 determines $f_{other}$ such that following Equation (1) is satisfied.

$$P(f_{overclock})+P(f_{low})+\Sigma^n P(f_{other})=NP(f) \quad (1)$$

In Equation (1), n is a number obtained by subtracting the number of CPUs whose clock frequency value has been changed to $f_{overclock}$ or $f_{low}$ f from the number N of the CPUs.

By setting $f_{other}$ to satisfy Equation (1), the multicore processor system 100 can improve the performance for a user while suppressing an increase in power consumption.

Figure 15:
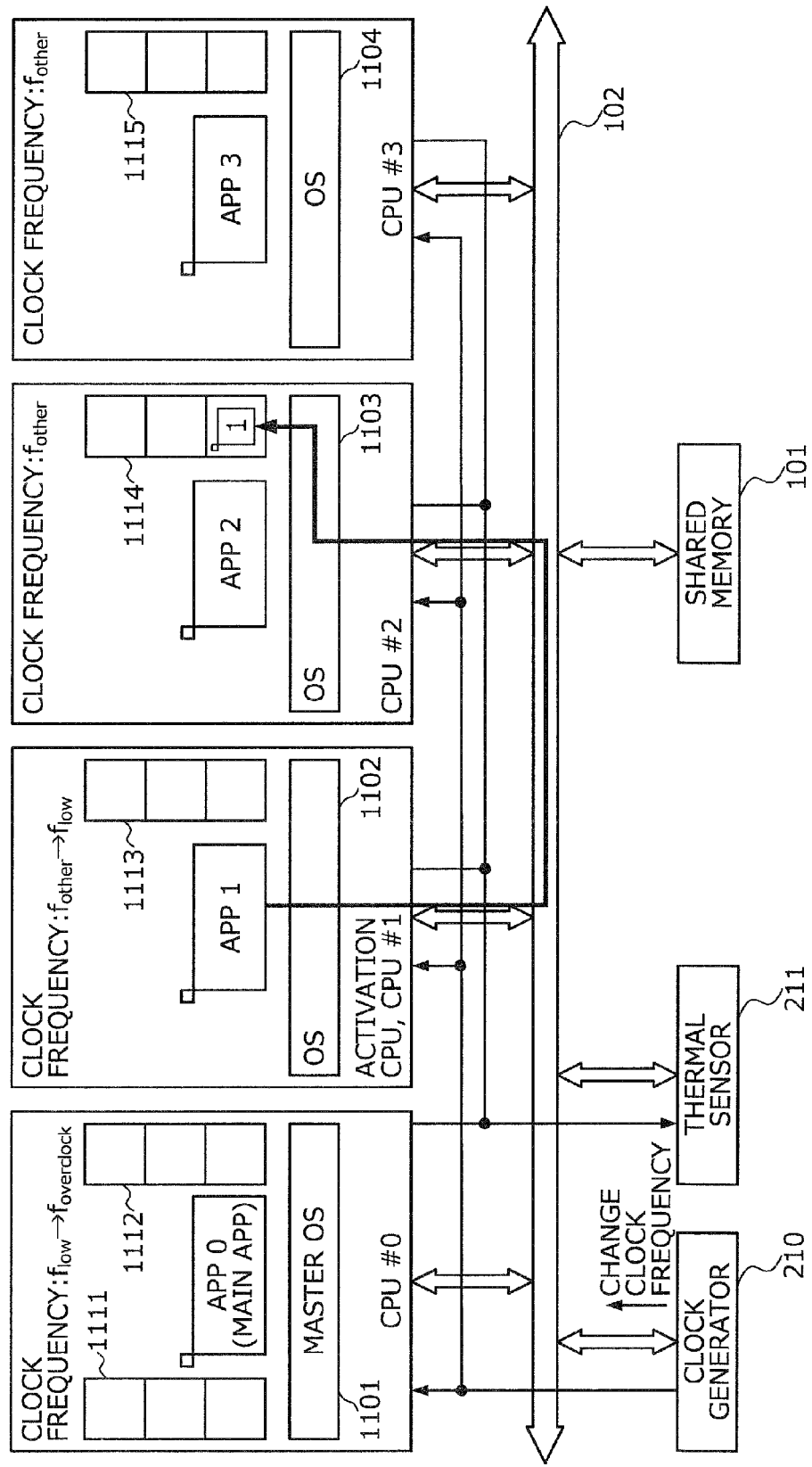
FIG. 15 is an explanatory view (part one) of an example of changing the clock frequency in association with resetting of the activation CPU.

FIG. 15 is an explanatory view (part one) of an example of changing the clock frequency in association with resetting of the activation CPU. In the multicore processor system 100 depicted in FIG. 15, the CPU #0 has been assigned the app 0, the CPU #1 has been assigned the app 1, the CPU #2 has been assigned the app 2, and the CPU #3 has been assigned the app 3.

In this state, for example, the CPU #0 identifies the app 0 as the main app. For example, the CPU #0 selects the CPU #1 as the activation CPU among the CPUs #0 to #3. The CPU #0 then controls the clock generator 210 to change the clock frequency of the CPU #0 from $f_{low}$ to $f_{overclock}$. The CPU #0 controls the clock generator 210 to change the clock frequency of the CPU #1 from $f_{other}$ to $f_{low}$.

The CPU #0 assigns the app 1 that has been assigned to the CPU #1 selected as the activation CPU to either the CPU #2 or the CPU #3. In the example depicted in FIG. 15, the CPU #0 assigns the app 1 to the CPU #2. The identification information of the assigned app 1 is stored into the run queue 1114.

Figure 16:
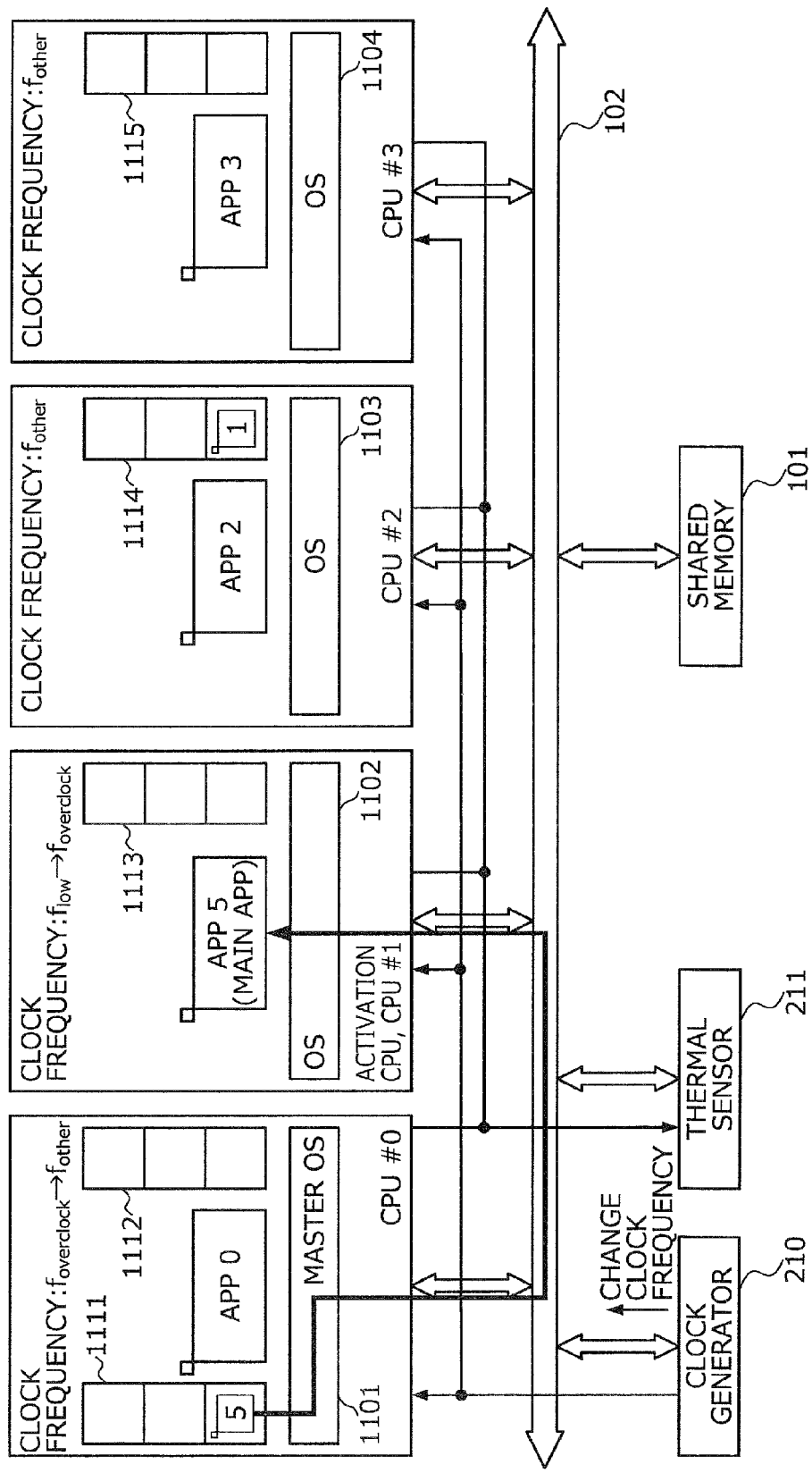
FIG. 16 is an explanatory view (part two) of the example of changing the clock frequency in association with resetting of the activation CPU.

FIG. 16 is an explanatory view (part two) of the example of changing the clock frequency in association with resetting of the activation CPU. The multicore processor system 100 depicted in FIG. 16 represents a transition from the state depicted in FIG. 15 to a state when an activation request for a new app is accepted. In FIG. 16, the CPU #0 newly accepts an activation request for the app 5. The identification information of the accepted app 5 is stored in the wait queue 1111.

The CPU #0 assigns the app 5 to the CPU #1, which is the activation CPU. The CPU #0 then controls the clock generator 210 to change the clock frequency of the CPU #1 from $f_{low}$ to $f_{overclock}$. After completion of the activation of the app 5, the CPU #0 sets the app 5 as the main app. Since the app 0 is no longer the main app at this time point, the clock frequency of the CPU #0 is changed from $f_{overclock}$ to $f_{other}$.

A flowchart of a scheduling process of operations described with reference to FIGS. 7 to 16 will be described with reference to FIGS. 17 to 20. The CPU executing the scheduling process may be any of the CPUs #0 to #3. In this embodiment, the CPU #0 will be described to execute the scheduling process as an example.

Figure 17:
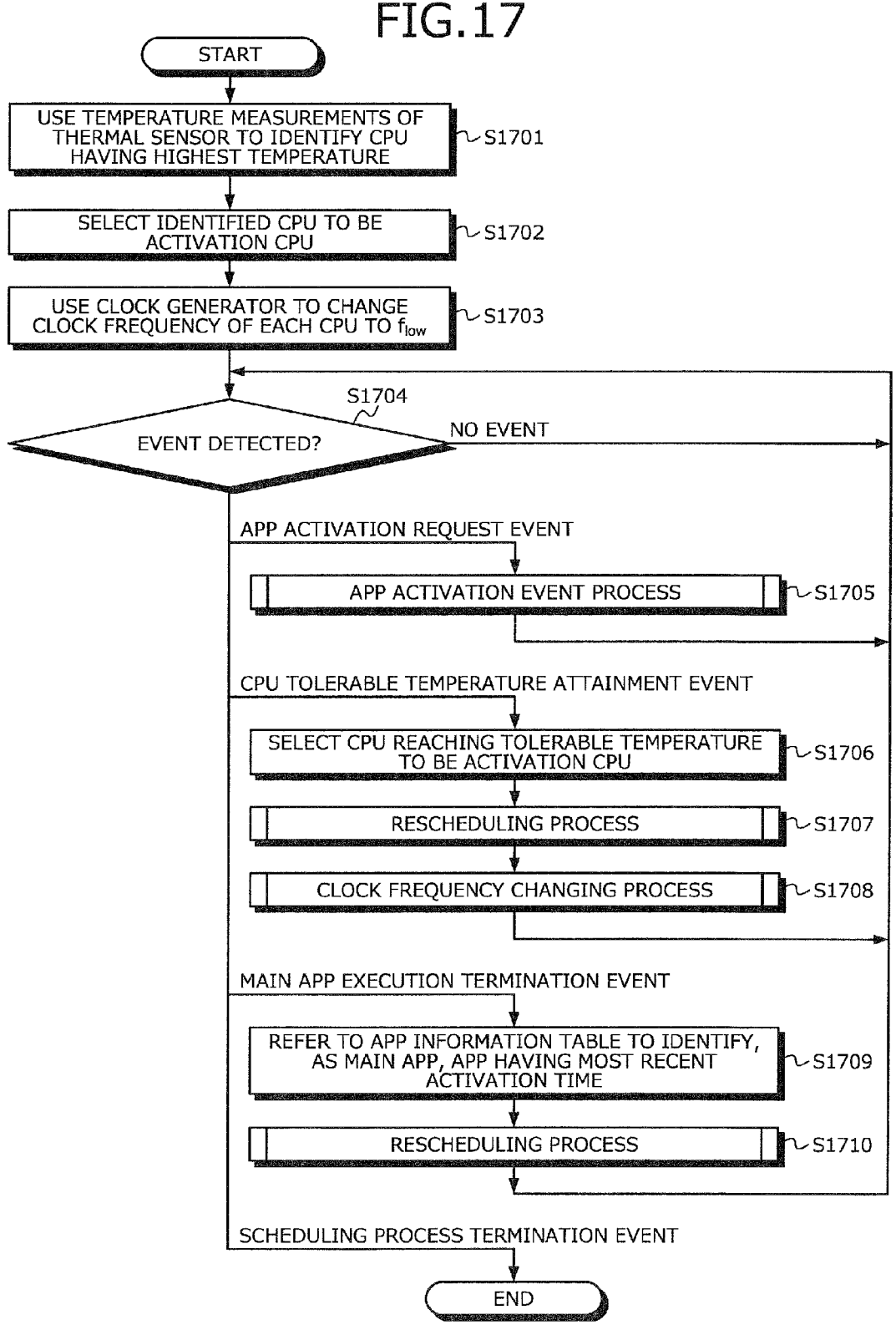
FIG. 17 is a flowchart of an example of a scheduling process procedure.

FIG. 17 is a flowchart of an example of a scheduling process procedure. The scheduling process is a process of determining a CPU to which an app is to be assigned. First, the CPU #0 uses the measurement result of the thermal sensor 211 to identify the CPU with the highest temperature (step S1701). The CPU #0 selects, as the activation, CPU the identified CPU among the CPUs #0 to #3 (step S1702). The CPU #0 then uses the clock generator 210 to change the clock frequencies of the CPUs to $f_{low}$ (step S1703).

The CPU #0 determines whether an event has been detected (step S1704). If an app activation request event has been detected (step S1704: APP ACTIVATION REQUEST EVENT), the CPU #0 executes an app activation event process (step S1705). Details of the app activation event process will be described later with reference to FIG. 18. After execution of the process at step S1705 has been completed, the CPU #0 goes to the operation at step S1704.

If a CPU tolerable temperature attainment event is detected (step S1704: CPU TOLERABLE TEMPERATURE ATTAINMENT EVENT), the CPU #0 selects, as the activation CPU, the CPU that has reached the tolerable temperature (step S1706). A CPU tolerable temperature attainment event is a detection of a CPU that has reached the tolerable temperature. In a specific detection method, the CPU #0 periodically reads the measurement result of the thermal sensor 211 and notifies the scheduling program if a CPU at the tolerable temperature or higher is present.

The CPU #0 then executes a rescheduling process (step S1707). Details of the rescheduling process will be described later with reference to FIG. 19. The CPU #0 executes a clock frequency changing process (step S1708). Details of the clock frequency changing process will be described later with reference to FIG. 20. After completion of the process of step S1708, the CPU #0 goes to the process of step S1704.

When a main app execution termination event is detected (step S1704: MAIN APP EXECUTION TERMINATION EVENT), the CPU #0 refers to the app information table 312 and identifies, as the main app, the app having the most recent activation time (step S1709). The CPU #0 then executes the rescheduling process (step S1710). After completion of the process of step S1710, the CPU #0 goes to the process at step S1704. After completion of the process at step S1710, the CPU #0 may change the clock frequency. For example, the clock frequency is changed to $f_{overclock}$ in the CPU to which the main app is assigned. The clock frequency is changed to $f_{other}$ in the CPUs other than the CPU to which the main app has been assigned and the activation CPU.

If a scheduling process termination event is detected (step S1704: SCHEDULING PROCESS TERMINATION EVENT), the CPU #0 terminates the scheduling process. If no event occurs (step S1704: NO), the CPU #0 goes to the process of step S1704 after a certain time has elapsed. The function of the scheduling process enables the multicore processor system 100 to detect the events causing a change of the activation CPU or the main app to execute respective processes for improving the performance for a user.

Figure 18:
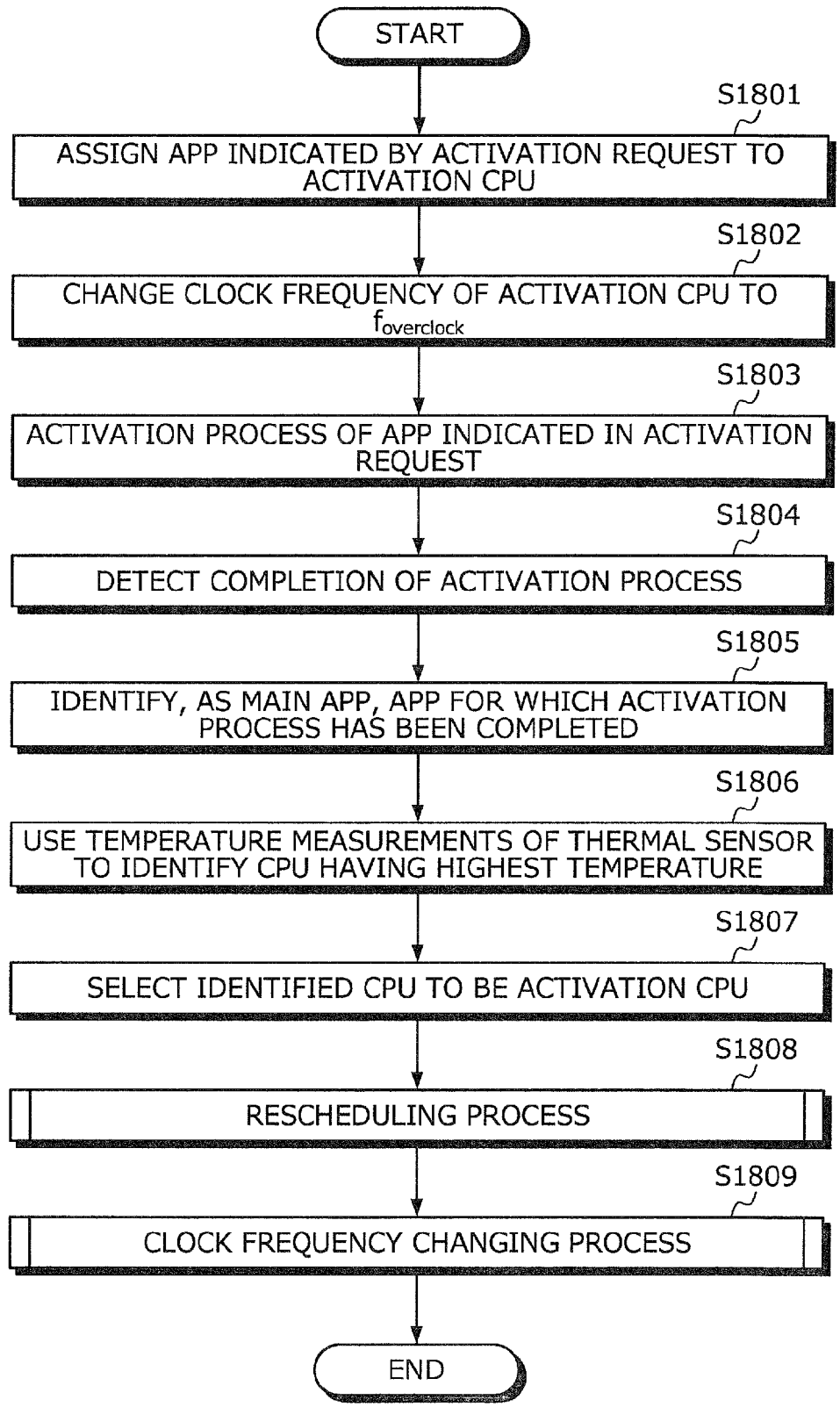
FIG. 18 is a flowchart of an example of an app activation event process procedure.

FIG. 18 is a flowchart of an example of an app activation event process procedure. The app activation event process is a process executed when an app activation event is detected. An app activated in the process depicted in FIG. 18 is the app of the activation request and specified by an argument in the app activation event.

The CPU #0 assigns an app specified by the activation request to the activation CPU (step S1801). The CPU #0 changes the clock frequency of the activation CPU to $f_{overclock}$ (step S1802). The CPU #0 then executes the activation process of the app specified by the activation request (step S1803). The CPU #0 detects that the activation process has been completed (step S1804). If the activation process is not completed, the CPU #0 continues waiting for the completion of the activation process.

After execution of the activation process, the CPU #0 identifies, as the main app, the app for which the activation process has been completed (step S1805). The CPU #0 uses the measurement result of the thermal sensor 211 to identify the CPU having the highest temperature (step S1806). The CPU #0 then selects the identified CPU as the activation CPU (step S1807). The CPU selected at step S1807 tends to be a CPU other than the activation CPU at step S1802. The CPU tends to be a different CPU because the activation CPU at step S1802 executes no app and has the clock frequency changed to $f_{low}$ and therefore, has a lower temperature.

The CPU #0 executes the rescheduling process (step S1808). The CPU #0 then executes the clock frequency changing process (step S1809). After execution of the process of step S1809, the CPU #0 terminates the app activation event process. The app activation event process enables the multicore processor system 100 to select the activation CPU and identify the main app in association with the app activation request event.

Figure 19:
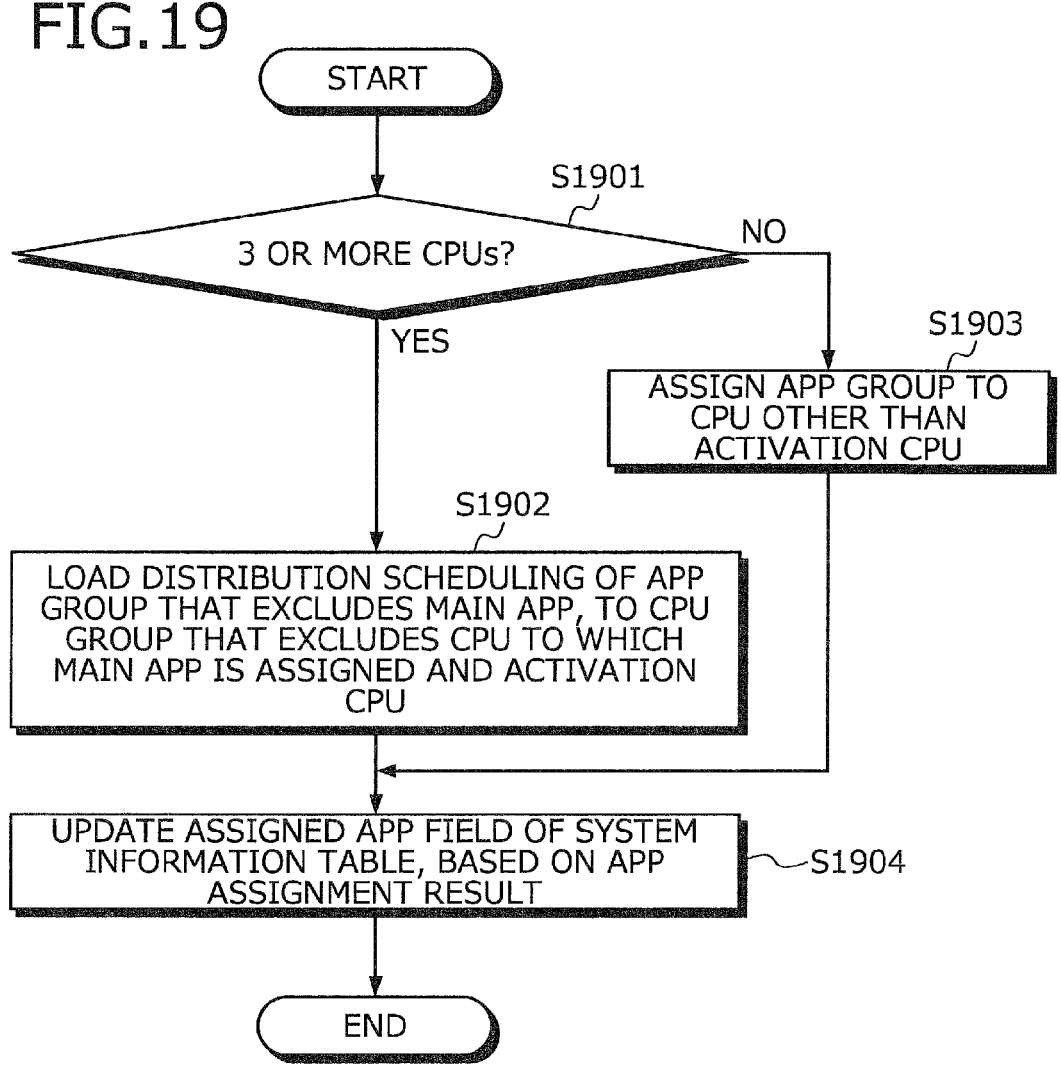
FIG. 19 is a flowchart of an example of a rescheduling process procedure.

FIG. 19 is a flowchart of an example of a rescheduling process procedure. The rescheduling process is a process of changing the assignment of apps when the activation CPU is selected or when the main app is identified.

According to whether the number of CPUs is three or more, the CPU #0 determines the scheduling of an app group that excludes the main app (step S1901). If the number of CPUs is three or more (step S1901: YES), the CPU #0 performs load distribution scheduling for a CPU group that excludes the CPU to which the main app is assigned and the activation CPU (step S1902). The load distribution scheduling is a process of assigning apps such that load amounts of CPUs are equalized. If the number of CPUs is less than three (step S1901: NO), the CPU #0 assigns the app group to a CPU other than the activation CPU (step S1903).

After completion of the operation at step S1902 or S1903, the CPU #0 updates the assigned app field of the system information table 311, based on the app assignment result (step S1904). After completion of the operation at step S1904, the CPU #0 terminates the rescheduling process. The rescheduling process enables the multicore processor system 100 to dedicate an activation CPU for the activation process and dedicate a CPU to which the main app is assigned for the execution of the main app.

Figure 20:
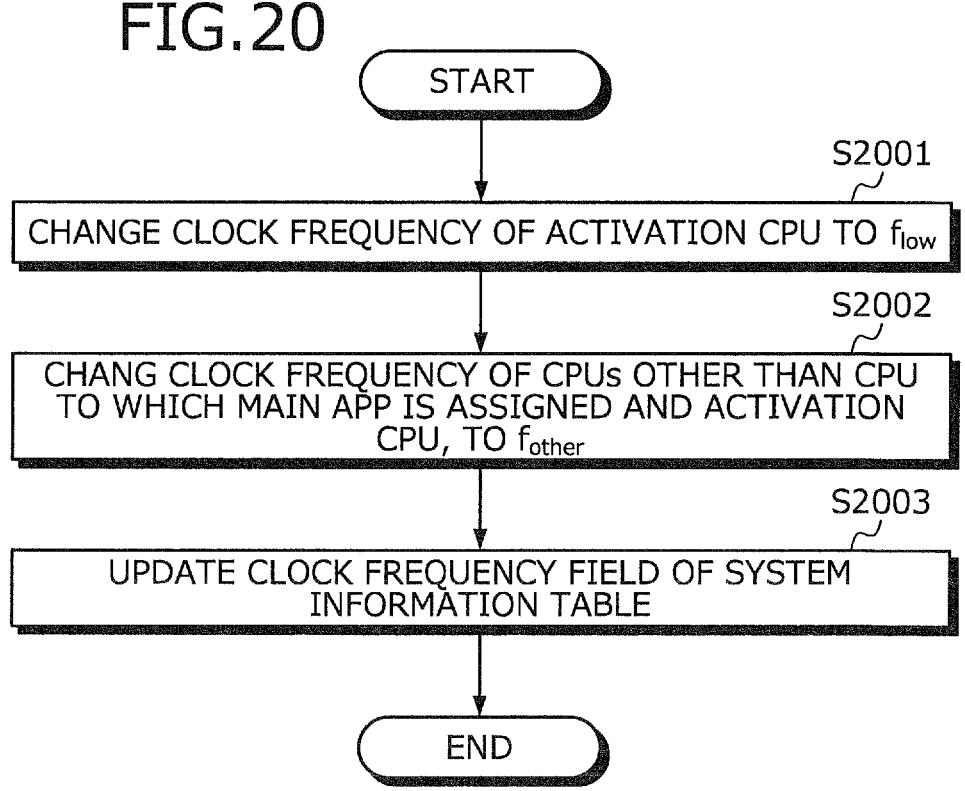
FIG. 20 is a flowchart of an example of a clock frequency changing process procedure.

FIG. 20 is a flowchart of an example of a clock frequency changing process procedure. The clock frequency changing process is a process of changing the clock frequencies of the CPUs when the activation CPU is selected.

The CPU #0 changes the clock frequency of the activation CPU to $f_{low}$ (step S2001). The CPU #0 changes the clock frequencies of the CPUs other than the CPU assigned with the main app and the activation CPU to $f_{other}$ (step S2002). The CPU #0 updates the clock frequency field of the system information table 311 (step S2003). The clock frequency changing process enables the multicore processor system 100 to reduce the clock frequency of the CPU with an increased temperature and therefore to lower the temperature of the CPU.

FIG. 21 is an explanatory view of an application example of the scheduling program according to the present embodiment. A mobile terminal such as a mobile telephone is assumed as this embodiment. In FIG. 21, operations of components of a mobile telephone system 2100 are the same as those depicted in FIG. 2. For example, the mobile telephone system 2100 has CPUs 2101, a ROM 2102, a RAM 2103, a flash ROM 2104, a flash ROM controller 2105, and a flash ROM 2106. The mobile telephone system 2100 also has a display 2107, an IF 2108, a keyboard 2109, a clock generator 2110, and a thermal sensor 2111. The components are connected to each other through a bus 2112.

It is assumed that Internet browsing is performed while music is listened to on the mobile telephone system 2100. In this case, the CPU #1 and the CPU #2 execute an audio playing process 2121 and a browser process 2122, respectively.

The mobile telephone system 2100 executes the scheduling program as the multicore processor system 100 described in this embodiment. For example, it is assumed that the CPU #0 is set as the activation CPU. In this case, if the mobile telephone system 2100 activates a game app according to an instruction from a user of the mobile telephone system 2100, a game process 2123 is assigned to the CPU #0. In this case, the CPU #0 is overclocked and can be dedicated for processing of the game process 2123, which is specified by the activation request, and therefore, the mobile telephone system 2100 can improve performance for the user.

As described above, the multicore processor system 100 selects from a CPU group, an activation CPU for app activation and transfers to another CPU, an app that was assigned to the activation CPU. As a result, at the time of an app activation request, the activation CPU can be dedicated for the app activation process and therefore, the multicore processor system 100 can shorten the time until completion of the app activation process. Since the shortening of the time until completion of the app activation process reduces, for example, the waiting time of the user making the activation request, the performance for the user can be improved.

The multicore processor system 100 may select the activation CPU based on the temperatures of the CPUs. By selecting a CPU having a larger CPU load amount and an increased temperature as the activation CPU, an assigned app is transferred to another CPU and the load amount of the activation CPU decreases and therefore, the multicore processor system 100 can lower the temperature of the CPU.

The multicore processor system 100 may select the activation CPU based on the usage rates of the CPUs. When a usage rate of a CPU is high, the CPU is likely to have an increased temperature. For example, by selecting the CPU having a higher CPU usage rate as the activation CPU, assigned apps are transferred to another CPU and the load amount of the activation CPU decreases. Therefore, the multicore processor system 100 can lower the temperature of the CPU having an increased temperature.

The multicore processor system 100 may select the activation CPU based on the number of apps assigned to the CPUs, respectively. When the number of apps assigned to a CPU is large, the CPU load amount may further increase and the CPU is likely to have an increased temperature. For example, by selecting, as the activation CPU, the CPU having a larger number of assigned apps, assigned apps are transferred to another CPU and the load amount of the activation CPU decreases. Therefore, the multicore processor system 100 can lower the temperature of the CPU having an increased temperature.

When an app assigned to the CPU selected as the activation CPU is assigned to another CPU, the multicore processor system 100 may reduce the clock frequency of the activation CPU to be lower than the current value. Since the app is assigned to another CPU, a load amount of the activation CPU decreases and the activation CPU can be operated at a lower clock frequency. Since the clock frequency of the activation CPU is reduced, the temperature of the activation CPU can be reduced. Since the temperature of the CPU is reduced, the multicore processor system 100 can prevent thermal runaway. The multicore processor system 100 can prevent thermal damage of the package.

When an app specified by an activation request is assigned, the multicore processor system 100 may change the value of the clock frequency of the activation CPU to a value at which the app specified by the activation request can be activated. As a result, the multicore processor system 100 can be changed from a state in which the app cannot be activated due to the value of the clock frequency being lowered to a state in which the activation process can be executed.

When the activation process of the app specified by the activation request is completed, the multicore processor system 100 may select a new activation CPU. When the activation process of the app is completed, the app is assigned to the activation CPU and therefore, the multicore processor system 100 can select the new activation CPU in preparation for a new activation request so that performance can be improved for a user.

The multicore processor system 100 identifies the main app based on the app activation time. The multicore processor system 100 may then assign an app other than the main app assigned to the CPU assigned with the main app, to a CPU other than the CPU assigned with the main app and the activation CPU. In the present embodiment, since no app is assigned to the activation CPU, the load amount increases in the other CPUs and the load amount increases also in the CPU assigned with the main app operated by a user, resulting in a shortening of an assignment time of the main app and deterioration in performance for the user. Therefore, by refraining from assigning an app other than the main app to the CPU assigned with the main app operated by a user, a CPU can be dedicated for the process of the main app and therefore, the multicore processor system 100 can suppress drops in performance for the user.

If it is detected that the execution of the main app is terminated, the multicore processor system 100 may identify a new main app and assign the new main app to the CPU that was assigned with the terminated main app. As a result, the CPU assigned with the new main app has no assigned app other than the main app and can be dedicated for the process of the new main app and therefore, the multicore processor system 100 can suppress drops in performance for the user. The method merely transfers one new main app. If the CPU assigned with the main app is overclocked for operating the terminated main app at high speed, the multicore processor system 100 can operate the new main app at high speed without changing the clock frequency.

If it is detected that the execution of the main app is terminated, the multicore processor system 100 may identify a new main app and assign another app assigned to the CPU assigned with the new main app to a CPU other than the activation CPU. As a result, the CPU assigned with the new main app has no assigned app other than the main app and can be dedicated for the process of the new main app and therefore, the multicore processor system 100 can suppress drops in performance for the user. The method does not require reassignment of the new app.

The scheduling method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an aspect of the embodiments, the time elapsing until completion of an activation process for software can be shortened.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium storing a scheduling program that causes a first core among a plurality of cores to execute a process comprising:
   selecting a core from the plurality of cores;
   referring to a storage to transfer first software assigned to the selected core, to a second core different from the selected core and among the plurality of cores, the storage being configured to store for each core among the plurality of cores, identification information of software assigned to the core;
   assigning second software to the selected core as a result of transferring the first software from the selected core to the second core, the second software being assigned when an activation request for the second software is accepted; and
   detecting that execution of third software, which is assigned to a third core, has been terminated, wherein
   the referring includes referring to time information, which indicates activation times of the software assigned to the cores, to identify fourth software to be run among the software assigned to the plurality of cores, the time information being referred to when termination of the execution of the third software is detected, and
   the assigning includes assigning the fourth software to the third core to which the third software was assigned, the fourth software being assigned when the fourth software is identified.

2. The non-transitory, computer-readable recording medium according to claim 1, the process further comprising
   acquiring temperature measurement results for the plurality of cores, wherein
   the selecting includes selecting the core from the plurality of cores, based on the acquired temperature measurement results for the plurality of cores.

3. The non-transitory, computer-readable recording medium according to claim 1, the process further comprising
   acquiring usage rates for the plurality of cores, wherein
   the selecting includes selecting the core from the plurality of cores, based on the acquired usage rates for the plurality of cores.

4. The non-transitory, computer-readable recording medium according to claim 1, the process further comprising
   referring to the storage to calculate for each core, a software count of software assigned to the core, wherein
   the selecting includes selecting the core from the plurality of cores, based on the calculated software count for each core.

5. The non-transitory, computer-readable recording medium according to claim 1, the process of further comprising
   changing a clock frequency of the selected core to a lower value, when the first software is assigned to the second core.

6. The non-transitory, computer-readable recording medium according to claim 1, the process further comprising
   changing a clock frequency of the selected core to a value enabling activation of the second software specified by the activation request, the clock frequency being changed when the second software specified by the activation request is assigned to the selected core.

7. The non-transitory, computer-readable recording medium according to claim 1, the processes further comprising
   detecting that an activation process of the first software specified by the activation request has been terminated, wherein
   the selecting includes selecting the core from the plurality of cores, when termination of the activation process is detected,
   the referring includes referring to the storage to transfer the first software to the second core, and
   the assigning includes assigning the second software to the selected core as a result of transferring the first software from the selected core to the second core, the second software being assigned when the activation request for the second software is accepted.

8. The non-transitory, computer-readable recording medium according to claim 1, wherein
   the storage is configured to store time information indicating activation times of the software assigned to the cores, and
   the process further comprises:
     referring to the time information to identify the third software to be run and among the software assigned to the plurality of cores; and
     referring to the identification information of the software assigned to the plurality of cores, to assign to a fourth core that is other than the third core to which the third software is assigned, fifth software that is assigned to the fourth core.

9. The non-transitory, computer-readable recording medium according to claim 8, the process further comprising
   detecting that execution of the third software has been terminated, wherein
   the referring includes referring to the time information stored in the storage to identify fourth software to be run among the software assigned to the plurality of cores, the time information being referred to when termination of the execution of the third software is detected, and the assigning includes assigning sixth software that is assigned to a core to which the fifth software is assigned, to a core different from the core to which the fifth software is assigned, the sixth software being assigned when the sixth software is identified.

10. A multicore processor system comprising
a processor configured to:
- select a core from a plurality of cores;
- refer to a storage to transfer first software assigned to the selected core, to a second core different from the selected core and among the plurality of cores, the storage being configured to store for each core among the plurality of cores, identification information of software assigned to the core;
- assign second software to the selected core as a result of transferring the first software from the selected core to the second core, the second software being assigned when an activation request for the second software is accepted; and
- detect that execution of third software, which is assigned to a third core, has been terminated, wherein the referring includes referring to time information, which indicates activation times of the software assigned to the cores, to identify fourth software to be run among the software assigned to the plurality of cores, the time information being referred to when termination of the execution of the third software is detected, and the assigning includes assigning the fourth software to the third core to which the third software was assigned, the fourth software being assigned when the fourth software is identified.

11. A scheduling method comprising:
selecting a core from a plurality of cores;
referring to a storage to transfer first software assigned to the selected core, to a second core different from the selected core and among the plurality of cores, the storage being configured to store for each core among the plurality of cores, identification information of software assigned to the core;
assigning second software to the selected core as a result of transferring the first software from the selected core to the second core, the second software being assigned when an activation request for the second software is accepted, and
detecting that execution of third software, which is assigned to a third core, has been terminated, wherein
the scheduling method is executed by a given core among the plurality of cores,
the referring includes referring to time information, which indicates activation times of the software assigned to the cores, to identify fourth software to be run among the software assigned to the plurality of cores, the time information being referred to when termination of the execution of the third software is detected, and
the assigning includes assigning the fourth software to the third core to which the third software was assigned, the fourth software being assigned when the fourth software is identified.

\* \* \* \* \*